United States Patent [19]

Bungo et al.

[11] Patent Number: 6,011,635
[45] Date of Patent: Jan. 4, 2000

[54] IMAGE READING APPARATUS AND METHOD FOR CORRECTING A READ IMAGE

[75] Inventors: Keiichiro Bungo, Asaka; Shinya Matsuda, Kyoto, both of Japan

[73] Assignee: Minolta Co., Ltd., Osaka, Japan

[21] Appl. No.: 08/773,369

[22] Filed: Dec. 26, 1996

[30] Foreign Application Priority Data

Dec. 27, 1995 [JP] Japan .................................... 7-340902
Dec. 3, 1996 [JP] Japan .................................... 8-322643

[51] Int. Cl.$^7$ ............................. H04N 1/04; H04N 1/38; G06K 9/36
[52] U.S. Cl. ......................... 358/488; 358/464; 358/463; 382/176; 382/199
[58] Field of Search .................................... 358/464, 452, 358/453, 467, 488, 463; 382/165, 181, 190, 199, 203, 175, 170, 176–179

[56] References Cited

U.S. PATENT DOCUMENTS 4,823,395  4/1989  Chikauchi ................................ 382/181
5,260,804  11/1993 Fukutomi et al. ....................... 358/444
5,377,019  12/1994 Okisu et al. ............................. 358/464

*Primary Examiner*—Edward L. Coles
*Assistant Examiner*—Mark Wallerson
*Attorney, Agent, or Firm*—McDermott, Will & Emery

[57] ABSTRACT

In the present invention, a specific region in which the edge of the document is specified as the exterior edge is discriminated for the presence of an image, and images separated from the exterior edge of an area positioned on the interior side of the interior edge of said specific region are discriminated as unnecessary images and erased. Also, in the present invention, images including parts adjacent to the edge of a document within a read image are examined and intersections of the edges and outlines of the images are discriminated, and unnecessary images of user fingers are discriminated from necessary images such as headers and the like and erased. Also, in the present invention, images directly adjacent to the exterior side and interior side of the document edges can be discriminated as unnecessary images by focusing on the hands of a user holding the book document and covering a part of the document at the exterior side, and recognizing similarities in pixel density.

54 Claims, 19 Drawing Sheets sub-scanning direction main-scanning direction

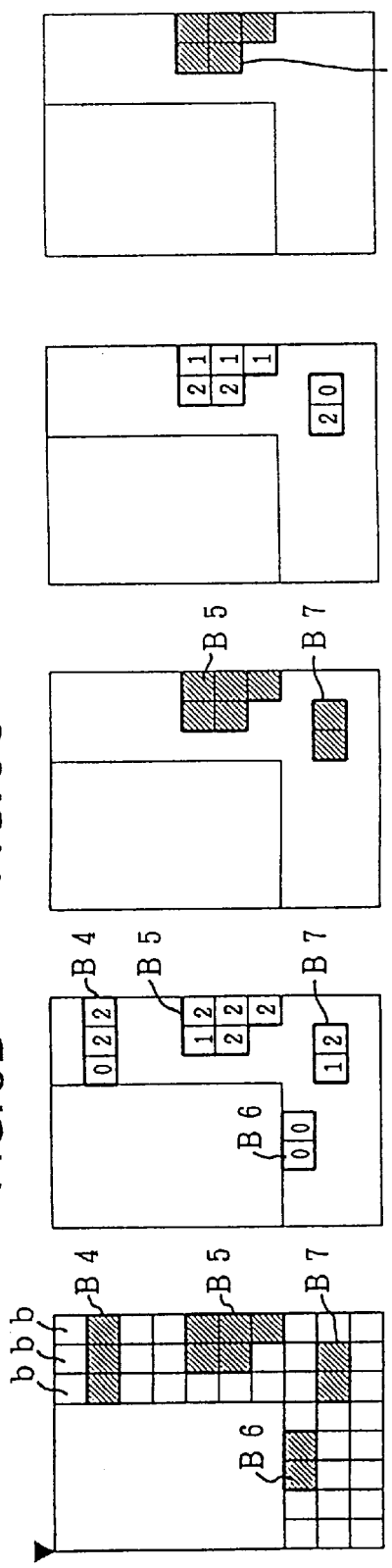
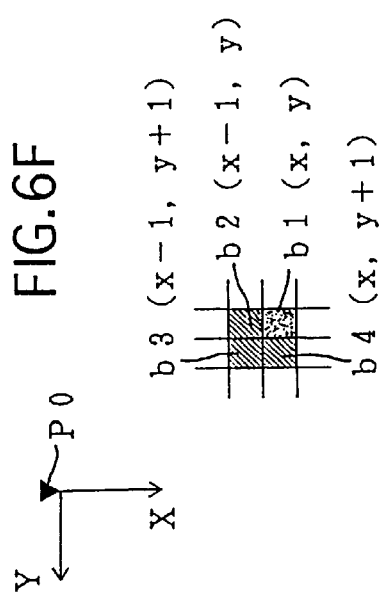
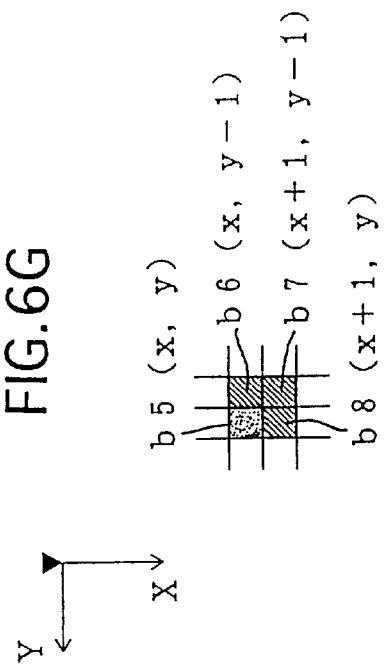

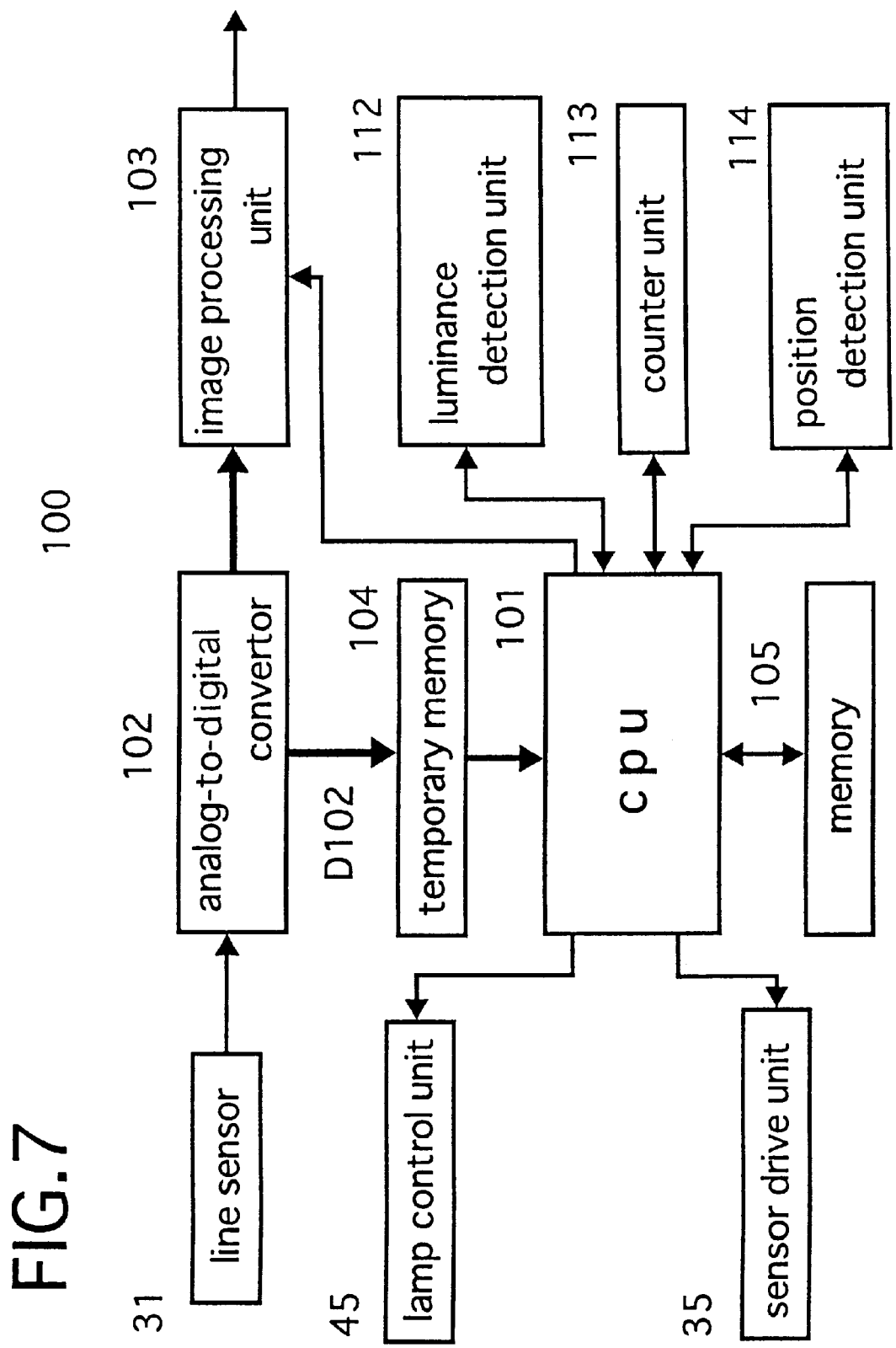

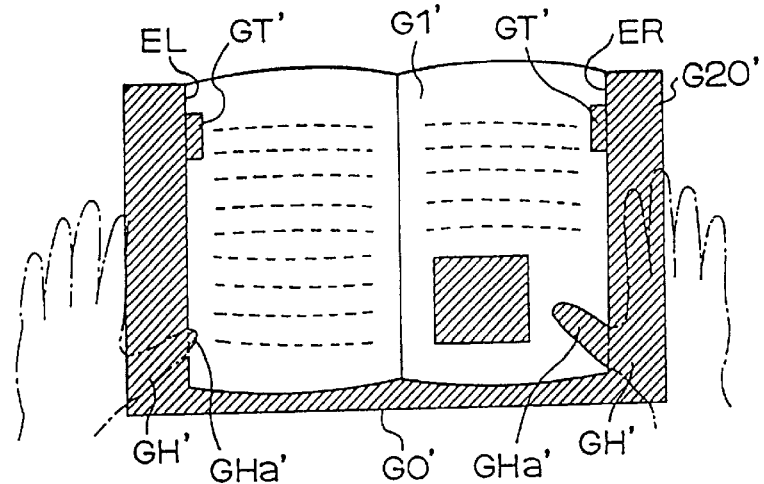
FIG.10A
FIG.10B
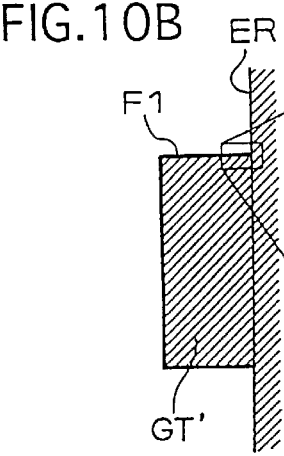
FIG.10C
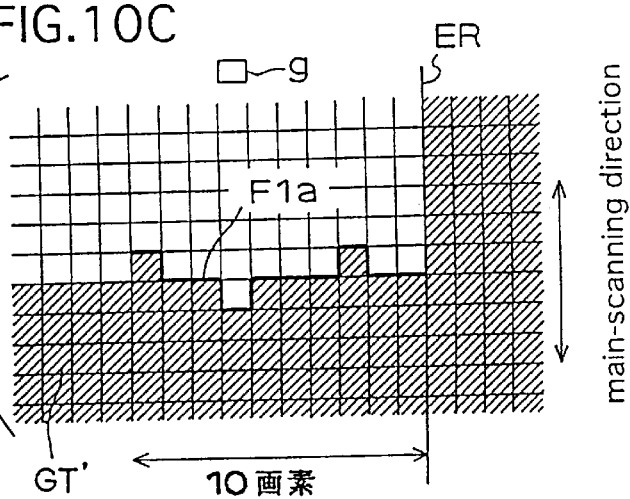
FIG.10D
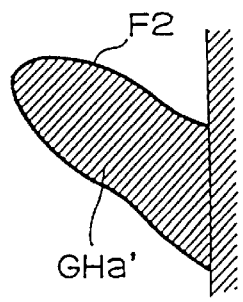
FIG.10E
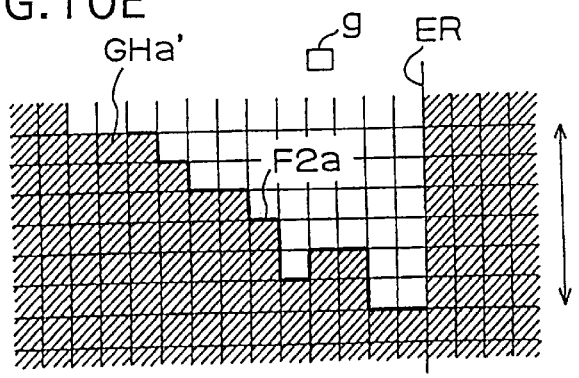

IMAGE READING APPARATUS AND METHOD FOR CORRECTING A READ IMAGE

BACKGROUND OF THE INVENTION

The present invention relates to an image reading apparatus and method for correcting a read image suitable for reading bound documents such as books, magazines and the like.

In recent years, image forming apparatuses called book scanners have been commercialized. In these book scanners, an image sensing unit is arranged above a document platen, and an open space of a size adequate to accommodate the placement of a book document or sheet document at a reading position is provided between said document platen and said image sensing unit. When a book document is read by such a book scanner, a user first places the book document on the document platen in an opened faced state so that the reading object surface (document surface) is visible (i.e., facing upward). Thus, a user places the closed book on the document platen and opens the book and turns the pages. Book documents refer not only to bound documents (i.e., bound document comprising a plurality of sheets of paper) such as books and magazines and the like, but also include filed documents.

When a user places a book document on the document platen with the document surface facing upward and presses the start key, scanning of the document is started by the image sensing unit arranged above the document platen, and the read image is successively output to an image output device in parallel to the scanning of the document. Such an image output device may be, for example, a digital copier or printer or the like capable of forming a copy image of the read image.

A user must press both edges of the book document in order to hold the book document in an open-faced conditions during image reading. In the case of thick book documents, this operation is inevitably required. Accordingly, the image sensing unit disposed above the document platen also reads the fingers and hands of the user pressing both edges of the book document along with the document image. It is obvious that when this read image is output to an image output device such as a printer, the printout of the output image will have a superior appearance if the unnecessary images corresponding to fingers and hands of the user can be erased.

Prior art related to methods for erasing such unnecessary images is well known, e.g., U.S. Pat. No. 5,377,019. In the related art, a document image is read in color by a color image sensing device, e.g., a color line charge-coupled device (CCD) and images of the user skin color are eliminated from the read image. Furthermore, the document portion within the read image is discriminated based on the document size detection result, and the pixel density is checked of the entirety or part of the edge region (i.e., blank region) of the document portion, and the images comprising pixels above a constant density, i.e., above a fixed value, are discriminated as unnecessary images and erased.

FIGS. 19A through 19C are illustrations of the disadvantages of the conventional art.

In the aforesaid method for extracting unnecessary images by color discrimination, errors readily occur in the extraction of the unnecessary images due to the difficulty in setting the skin color range of users.

On the other hand, in methods which extract unnecessary images present within the edge region of the document portion by simple density discrimination, the detection object region A8 of the unnecessary image must be limited to the white space on the periphery of document 90 so as to avoid erasure of the necessary image, as shown in FIG. 19A. That is, the detection object region A8 must be set so as to not overlap the print region A7 comprising printed text or graphics. Therefore, when a document has a relatively large area of white space on the periphery of the document as shown in FIG. 19B, or when the majority of a page is blank as shown in FIG. 19C, the finger of a user may protrude from the detection object region A7 even though the user presses down the book document without obscuring the image region of text of graphics, such that the images Gh of the finger tip will remain in output images G91 and G92. Furthermore, headers, images of handwriting written in the margins, and page numbers and the like printed near the edge of the sheet are also erased.

When a header is provided near the edge of the sheet, it is often printed in white on a colored background or in color print to highlight the header text., and the area in which such a header is printed (i.e., header region) is rectangular in shape so as to form a vertically oriented rectangle. The outline of the header region comprises a side parallel to and a side perpendicular to the edges of the document. In contrast, when inferring the shape and direction of the user fingers holding the book document, the outline of the image of the user fingers or hands perpendicular to the edge of the document is extremely small, and in most cases the outline and sheet edge are inclined so as to mutually intersect.

SUMMARY OF THE INVENTION

An object of the present invention is to discriminate and erase unnecessary images using the characteristics of said unnecessary images to be erased.

In the present invention, an area possibly containing unnecessary images within a read image, i.e., a specific region (e.g., a box-like region) in which the edge of the document (i.e., the periphery of part thereof) is specified as the exterior edge is discriminated for the presence of an image, and images separated from the exterior edge of an area positioned on the interior side of the interior edge of said specific region, i.e., images extending to the exterior edge of said specific region are discriminated as unnecessary images. When the specific region is suitably set so as to overlap unnecessary images, unnecessary images can be accurately discriminated and erased even when the periphery of a document has large margins.

In the present invention, images including parts adjacent to the edge of a document within a read image are examined and intersections of the edges and outlines of the images are discriminated, and unnecessary images of user fingers are discriminated from necessary images such an headers and the like and erased. Since the outlines of a hand are curved, unnecessary images may be discriminated by the presence of curves within an image containing parts adjacent to the edges of a document. Accordingly, unnecessary images such as user hands can be discriminated even when the document is provided with non-rectangular header, e.g., triangular shaped headers at the corners of the sheet. Furthermore, unnecessary images can be accurately discriminated if discrimination is accomplished using both the presence of curves and intersection state as described above even when, for example, the shape of a header is largely rectangular and rounded at the corners on the interior side.

In the present invention, images directly adjacent to the exterior side and interior side of the document edges can be discriminated as unnecessary images by focusing on the hands of a user holding the book document and covering a part of the document at the exterior side, and recognizing similarities in pixel density.

These and other objects, advantages and features of the present invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIGS. 6A through 6G show the sequence of block group discrimination;

FIG. 7 is a block diagram of the signal processing unit of the book scanner;

FIGS. 10A through 10E illustrate a method of extracting unnecessary images of the second embodiment;

DETAILED DESCRIPTION OF THE INVENTION

First Embodiment

Figure 1:
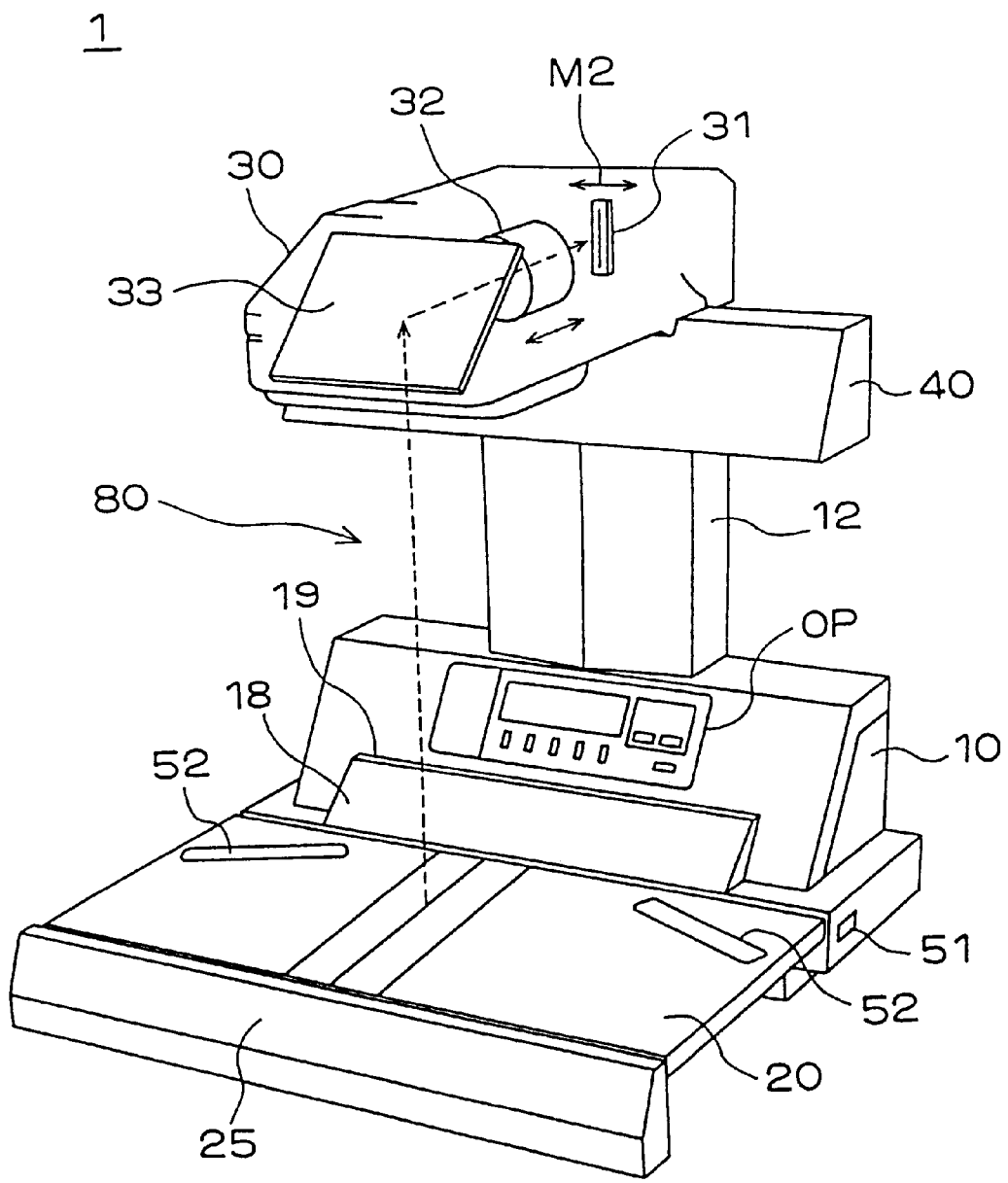
FIG. 1 is a perspective view of the exterior of a book scanner one an embodiment of the image reading apparatus of the present invention.
Figure 2:
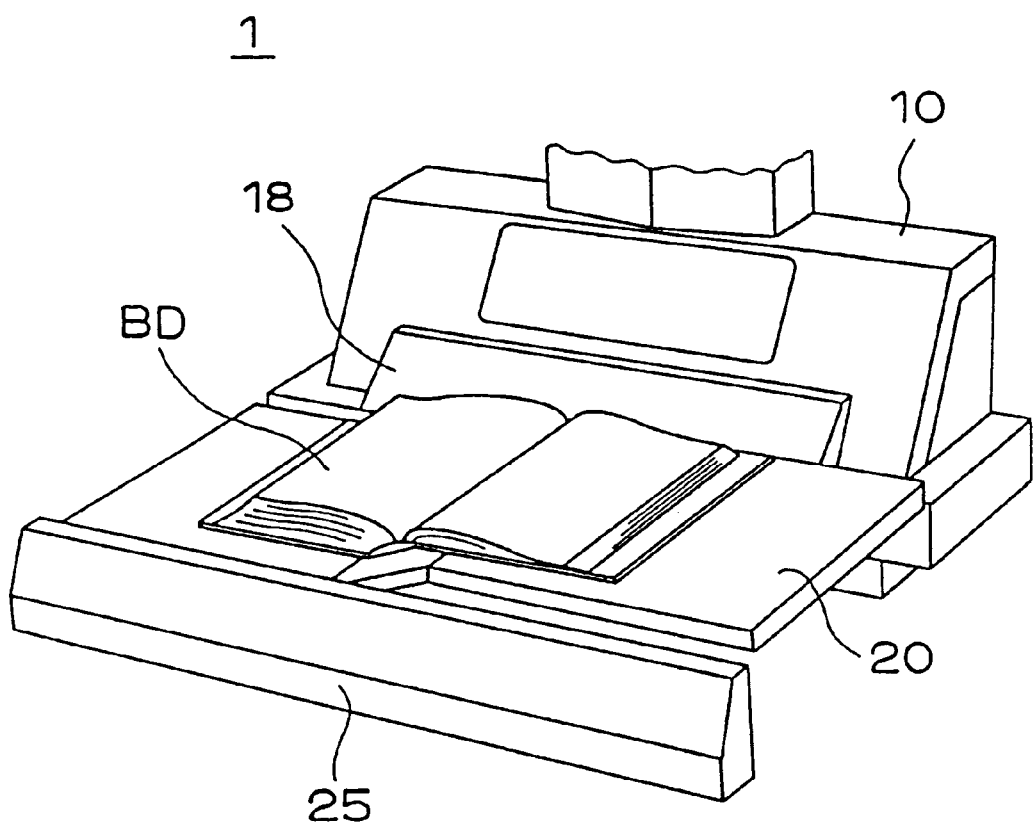
FIG. 2 shows a book document placed on the document platen.
Figure 3A:
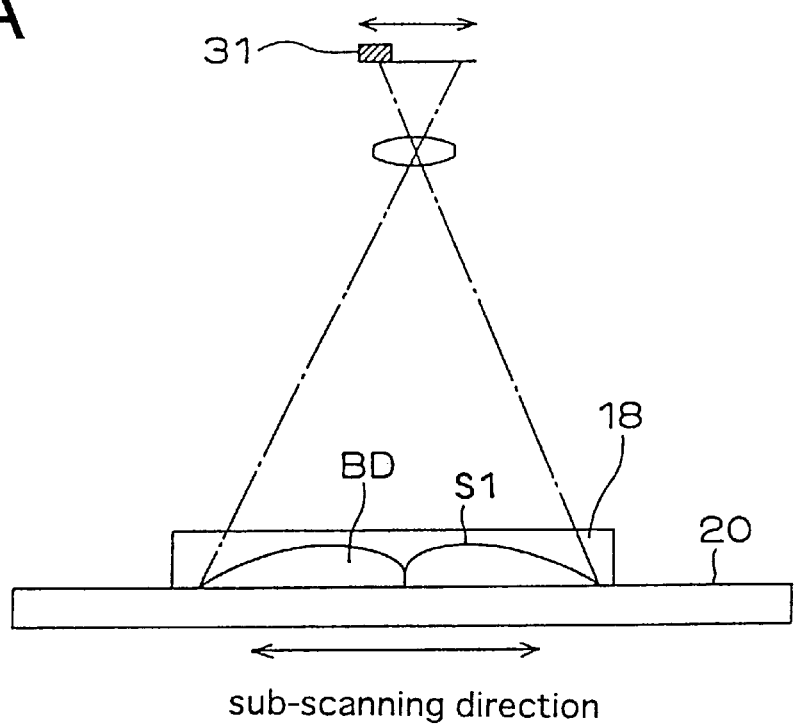
FIGS. 3A and 3B illustrate reading by the book scanner.
Figure 3B:
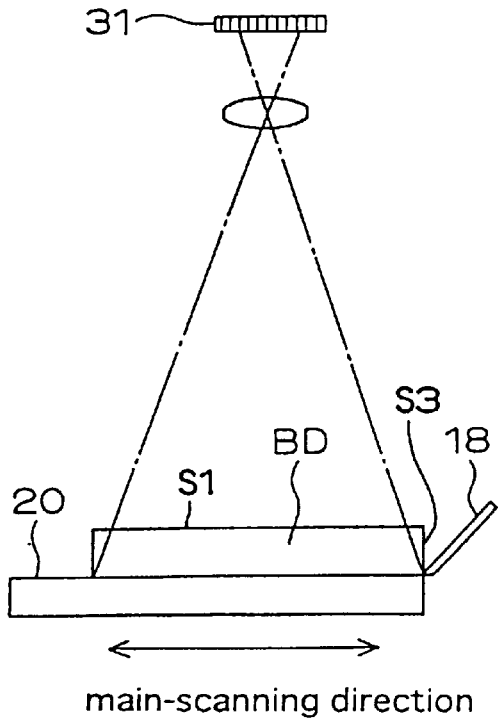

FIG. 1 is a perspective view of the exterior of a book scanner 1 of a first embodiment f the image reading apparatus of the present invention. FIG. 2 shows a book document BD placed on the document platen. FIGS. 3A and 3B illustrate reading by the book scanner 1.

Book scanner 1 comprises a housing 10 to accommodate electrical circuits and the like, document platen 20 of a dark color to support a book document, image sensing unit 30 to convert a document image to electrical signals, and a lamp unit 40 to illuminate the book document. Document platen 20 is disposed at the front side of housing 10. Image sensing unit 30 is arranged above document platen 20, and is supported in an overhanging configuration by column 12 extending upward from the top surface of housing 10. Lamp unit 40 is disposed below image sensing unit 30, and is fixedly attached to column 12. An open space 80 is provided between document platen 20 and image sensing unit 30 so as to be open to the outside of the apparatus, and said open space 80 is sufficiently large to accommodate placement of book documents. The distance between document platen 20 and image sensing unit 30 is 30 cm or more.

An operation panel OP is provided at the top front edge of housing 10, and a projection panel (rangefinder) 10 is fixedly attached at the bottom edge to detect the height of the document surface. Operation panel OP is provided with a liquid crystal display, and buttons for setting the reading modes and reading conditions (e.g., reading size, magnification, number of output pages, density). The front of the side surface of projection panel 18 is a glossy, flat surface, and is inclined at 45° relative to the top of the document platen 20. The image of edge surface S3 (refer to FIG. 3B) in a direction perpendicular to the open face direction of book document BD is reflected in projection panel 18, and the image of projection panel 18 in this state is sensed together with the document image. The top edge of projection panel 18 functions as a color panel 19 for shading correction. A main switch 51 is provided on the right side surface of housing 10 facing opposite operation panel OP. Start keys 52 are provided is on bilateral sides of document platen 20 to allow a user start the reading operation while manually holding a book document in place. An armrest 25 is provided on the front side of document platen 20.

In FIG. 1, the image sensing unit 30 is provided with a line sensor 31 comprising a CCD array, image forming lens 32, and mirror 33. A document image is projected onto the photoreceptor surface of line sensor 31 via an optical system comprising mirror 33 and image forming lens 32. Image forming lens 32 is movable in forward-and-backward directions, and is positioned by an autofocus mechanism not shown in the drawings.

Line sensor 31 is mounted to the movable body of a scanning mechanism not shown in the drawings, and is movable horizontally along lateral directions (subscan direction) M2 while maintaining the CCD element array direction fixed in the vertical direction. A two-dimensional document image is read via the aforesaid horizontal movement of line sensor 31. In book scanner 1, an imaging plane is formed via the horizontal movement of line sensor 31. When an area sensor is substituted for line sensor 31, its photoreceptor surface becomes the image sensing plane. The main scan direction of the document image is the front-to-back direction on document platen 20, and is the vertical direction on the image sensing plane.

The aforesaid book scanner 1 is an image reading apparatus suitable for reading book documents. A comprehensive copying system suitable for various types of document can he constructed by combining book scanner 1 with an image output apparatus such as a digital copier or printer.

When using book scanner 1, a user places a book document BD in an open state facing upward on document platen 20, as shown in FIG. 2. At this time, the border of right and left pages is aligned with the center in the lateral direction of document platen 20, and book document BD is positioned by pressing against the bottom edge of projection panel 18. That is, the border between projection panel 18 and document platen 20 becomes the reference line for placement of the document. The center of this reference line is reference position P0 (refer to FIG. 4A). Document platen 20 is supported by a spring mechanism so as to have right and left sides independently movable. Thus, the heights of right and left pages of the open book document become virtually identical and a constant image sensing distance is maintained regardless of the thickness of book document BD.

Book scanner 1 of the present embodiment, scans the same document twice (to read the document image). Since book document BD differs from a sheet document in that the document surface is curved, image sensing focusing adjustment and image distortion correction processes are required in accordance with said curvature. Processing to correct differences in luminance is also required. Therefore, the state of curvature is detected in a first scan (hereinafter referred to as "pre-scan"), and a second reading scan is performed (hereinafter referred to as "main scan") based on the result of the pre-scan. Image output to image output devices is accomplished concurrently with the main scan. The moving direction of line sensor 31 during the main scan is the opposite direction relative to the direction of the pre-scan. The reading modes include a mode to read both right and left pages in a batch (scanning in the same mannor as for sheet documents), and a mode to read right and left pages separately. In either reading mode both the pre-scan and main scan are performed for each page.

When reading a book document BD, a user often holds the edges of the book document to maintain it in an open state or to flatten the document surface as much as possible. Because the fingers or hands of the user are often read along with the document image in such circumstances, it is desirable to execute image correction to erase the image of the user fingers and hands to provide a better appearance when the read image is output to an image output device.

In the present embodiment, when a user holds bilateral edges of a book document, a prerequisite is that the user do so in a manner which does not obscure the image to be read (necessary image) such as text, graphics or the like. That is the intention. In other words, not obscuring a necessary image means that images corresponding to the hands and fingers of a user (unnecessary images to be erased) do not overlap the necessary images.

The method of correcting a read image by book scanner 1 of the first embodiment is described hereinafter.

Figure 4A:
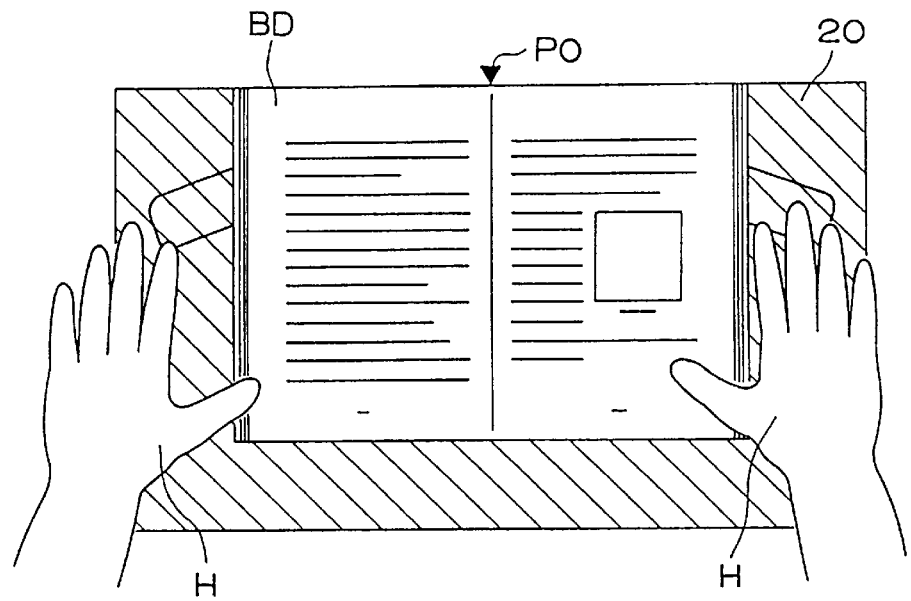
FIGS. 4A and 4B are plan views showing examples of the reading of book documents.
Figure 4B:
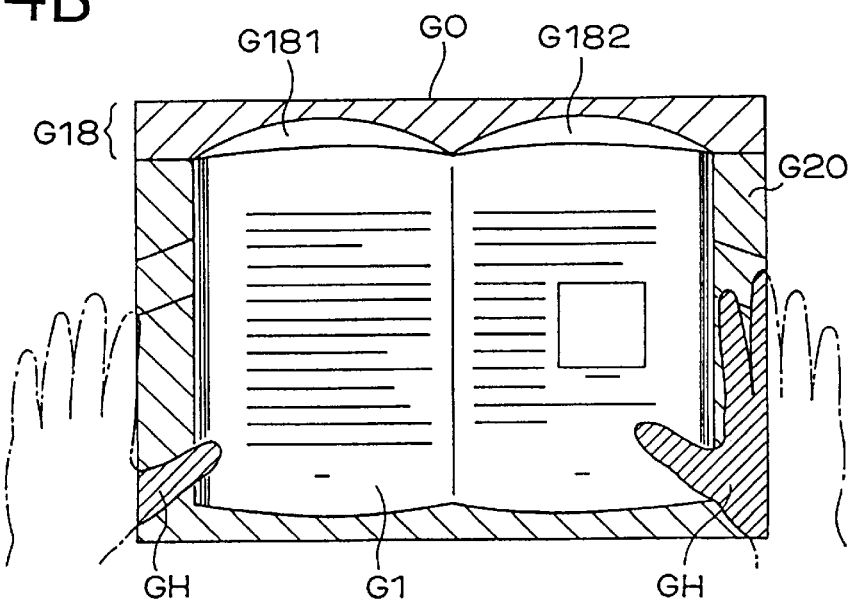

FIGS. 4A and 4B are plan views showing an example of reading a book document BD. FIG. 4A illustrates a user hand H pressing down a book document BD on document platen 20, and FIG. 4B shows the read image G0.

The read image G0 comprises the read image G1 of the read object surface (document surface) of book document BD, the read image G20 of document platen 20 (document platen image), read image GH of user hand H, and read image G18 of the projection panel 18 (projection panel image). The images G181 and G182 in projection panel image G18 express the shape of edge surface S3 of the open book document BD. Images other than the images G181 and G182 (edge images) in is projection panel image G18 are background ages reflected in projection panel 18.

The border between projection image G18 and document platen image G20 corresponds to the previously mentioned reference line, such that the height of document surface S1 can be calculated from the distance (number of pixels) between said border and the outlines of edge images G181 and G182. The border between document surface image G1 and document platen image G20 can be readily determined by using the density difference of the color of the background of the document surface and the color of document platen 20. That is, the edges of the book document BD on the image sensing plane can be determined by determining the color between the document surface image G1 and the document platen image G20.

The curvature of the top edge and bottom edge of document surface image G1 is due to the variable height of the document surface. That is, the object near the image sensing plane is sensed as larger than objects farther away. During the main scan, the curved document surface image G1 is subjected to image processing to correct said image to an image when the height of the document surface is constant based on document surface height information obtained by the pres-scan.

Figure 5A:
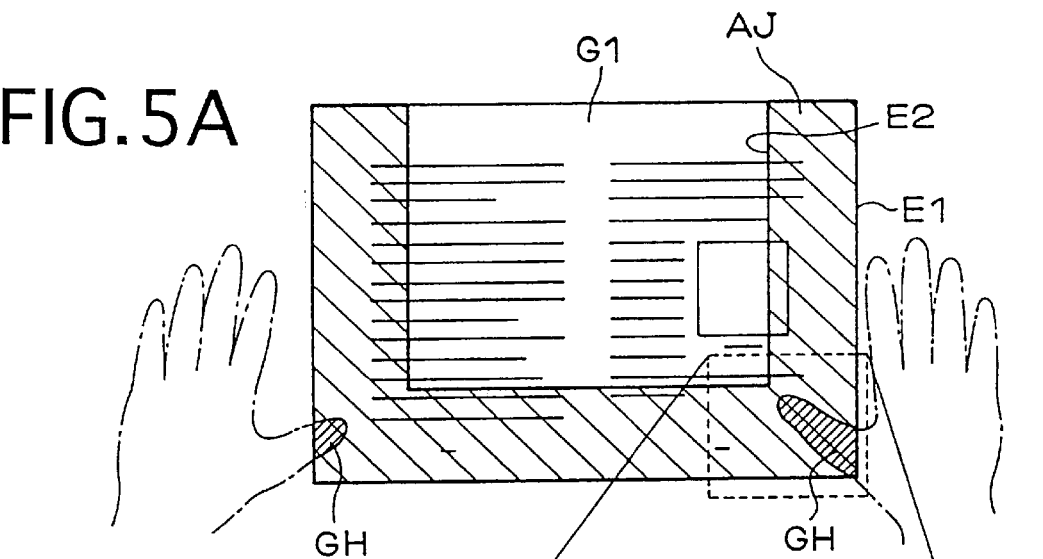
FIGS. 5A through 5C briefly illustrate extraction of unnecessary images.
Figure 5B:
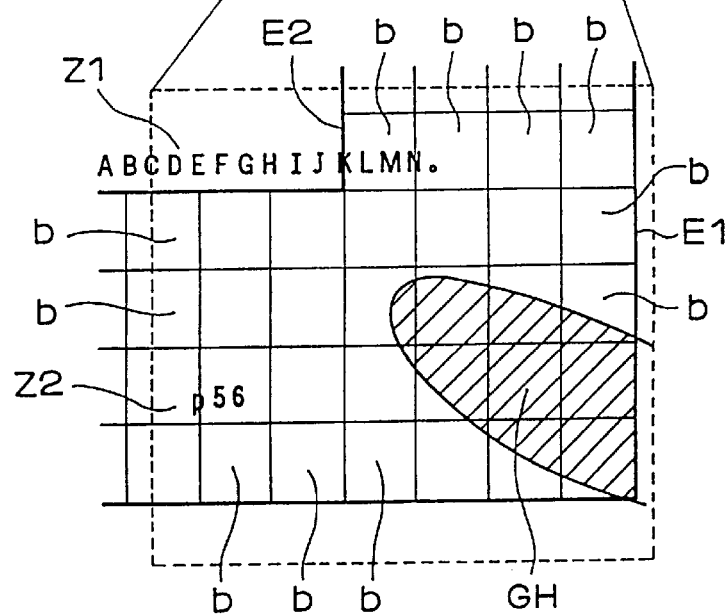
Figure 5C:
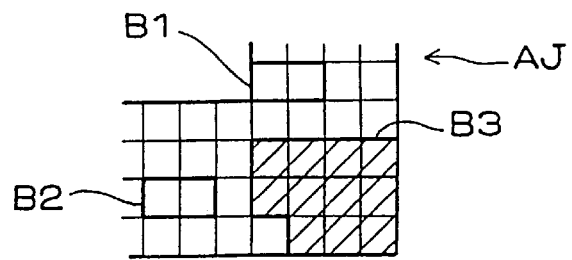

FIGS. 5A through 5C are illustrations briefly showing the extraction of unnecessary images. FIG. 5B is an enlargement of the area circumscribed by a dashed line in FIG. 5A.

As shown in FIG. 5A, a discrimination target area AJ is set having a concave shape and designates the edges (bilateral edges and bottom edge in the drawing) of document surface image G1. The width of the three sides of discrimination target area AJ is selected so that the interior edge E2 of discrimination target area AJ overlaps the necessary image of text or graphics within the document surface image G1. For example, the width of each bilateral side may be set at 30% of the total length of the sides of image G1, and the width of the bottom side may be set at 30% of the total vertical length. It is not necessary to restrict the detection subject area A8 of the unnecessary images (discrimination target area) to the margin areas of the edges of the document surface as in conventional methods.

As shown in FIG. 5B, the discrimination target area AJ is finely divided into many blocks b to form a matrix, and the presence or absence of an image in each box is discriminated. As shown in FIG. 5B, a part of text line Z1, text line Z2 expressing the page number, and the image GH of the user hand H are present within the discrimination target area AJ. Methods for discriminating the presence of an image include methods for discriminating the magnitude of the mean value of luminance of pixels within block b (i.e, the image sensing units of line sensor 31), and methods for discrizminating the number of pixels within block b having a luminance below a threshold value.

When a user holds the book document, the user does so while not obscuring text or graphics while the hands of the user extend from the exterior edge of the document to the interior side, and these areas form an aggregate of a plurality of blocks containing an image or mutually adjacent thereto, such that block groups adjacent to the exterior edge or separated from the interior edge within the discrimination target area are discriminated as unnecessary images.

In FIG. 5C, the aggregate of a plurality of blocks b having an image or mutually adjacent thereto are three block groups comprising block group B1 including text line Z1, block group B2 including text line B2, and block group B3 including image GH. Among these block groups B1, B2, B3 only block group B3 is separated from the interior edge E2 and connected to the exterior edge E1.

A read image comprising only necessary images is obtained by discriminating the extracted block group B3 as an unnecessary image and erasing the image within said block group B3. The erasure of the image within the block group B3 may be accomplished by substituting values expressing the background color for the data values of the pixels within the block group B3.

FIGS. 6A through 6C show the sequence of discriminating the block groups.

In FIG. 6A, four block groups comprising block groups B4, B5, B6, and B7 are extracted as primary candidates for unnecessary images to be erased. These block groups B4, B5, B6, and B7 are checked for attributes of block b. First, as shown in FIG. 6F, one block b1 is targeted, and the three adjacent blocks b2, b3, b4 near the reference line P0 as viewed from block b1 are checked for the presence of images. If all three blocks b2, b3, b4 are image-free, the attribute of block b1 is set at [1]. If at least one block among the three blocks b2, b3, b4 has an image, the attribute of block b1 is set at [2]. When the block b1 is connected to interior edge E2, the attribute of block b1 is set at [0] (FIG. 6B). Thus, the attribute of each block is set, and block groups B5 and B7 containing block b having attributes of [1] are designated secondary candidates for unnecessary images (FIG. 6C). The process of extracting secondary candidates from among the primary candidates is called the interior edge discrimination process.

Then, attributes of block b of the secondary candidates are checked. As shown in FIG. 6G, one block b5 is targeted, and the three adjacent blocks b6, b7, b8 on the far side of reference line P0 as viewed from block b5 are checked for the presence of images. If all three blocks b6, b7, b8 are image-free, the attribute of block b5 is set at [0]. If at least one block among the three blocks b6, b7, b8 has an image, the attribute of block b5 is set at [2]. When the block b5 is connected to exterior edge E1, the attribute of block b5 is set at [1] (FIG. 6D). Thus, the attribute of each block is set, and block group B5 containing block b having an attribute of [1] is designated a tertiary candidate for an unnecessary image (FIG. 6E). The process of extracting tertiary candidates from among the secondary candidates is called the exterior edge discrimination process.

Finally, the dimensions of the tertiary candidates are discriminated. For example, if the tertiary candidate has a size equivalent to a finger with an extreme difference in length vertically and horizontally, the tertiary candidate is designated an unnecessary image. Thus, the error of erasing necessary images such as headers, ruled lines and the like can be avoided.

FIG. 7 is a block diagram of signal processing unit 100 of book scanner 1.

The output of line sensor 31 is converted, for example, to 8-bit image data D102 by analog-to-digital (AD) converter 102. During the pre-scanning, the image data D102 are temporarily stored in temporary memory 104, and transmitted to luminance detection unit 112 via CPU 101. The luminance detection unit 112 generates a luminance histogram by calculating the luminance of each pixel of each predetermined line in the subscan direction, and calculating the background luminance and the threshold value for discriminating the presence of an image. Counter unit 113 counts the number of pixels having a luminance below the value. Position detection unit 114 expresses the scan position in the sensed image plane. CPU 101 extracts the unnecessary image in the aforesaid sequence based on the three data of background luminance, frequency of pixels corresponding to an image, and scan position. During the main scan, image data D102 are transmitted from AD converter 102 to image processing unit 103. CPU 101 instructs image processing unit 103 to change the pixel values at positions corresponding to an unnecessary image extracted during the prescan. Image processing unit 103 erases unnecessary images among the read image G0 during the main scan, and after said erasure, outputs the read image to an image output device. CPU 101 controls the lamp control unit 45 and drive system including sensor drive unit 35 in accordance with programs stored in memory 105.

The first embodiment allows high precision in setting the detection region for unnecessary images compared to detecting the peripheral edges of a document by a document size sensor, and simplifies the mechanical construction of the apparatus by discriminating the peripheral edges of a document using density differences between the document platen and document in a sensed image. The edges of a document on the image sensing plane can be determined by providing a document size sensor of a mechanical type separately to line sensor 31 so as to detect the edges of the document, or calculations based on the positional relationship between document platen 20 and line sensor 31.

Although the first embodiment has been described in terms of an example providing a concave-shaped discrimination target area AJ, a box-like discrimination target area AJ designating the periphery of the document as the exterior edge is desirable when a book document BD is positioned before or after the center area of the document platen 20. That is, a location likely to be pressed by a user within the document may be set as the discrimination target area AJ. In a reading mode wherein only one of two bilateral pages is read of an open book document, the reading range is adequate if the discrimination target area AJ is set.

Second Embodiment

Figure 8:
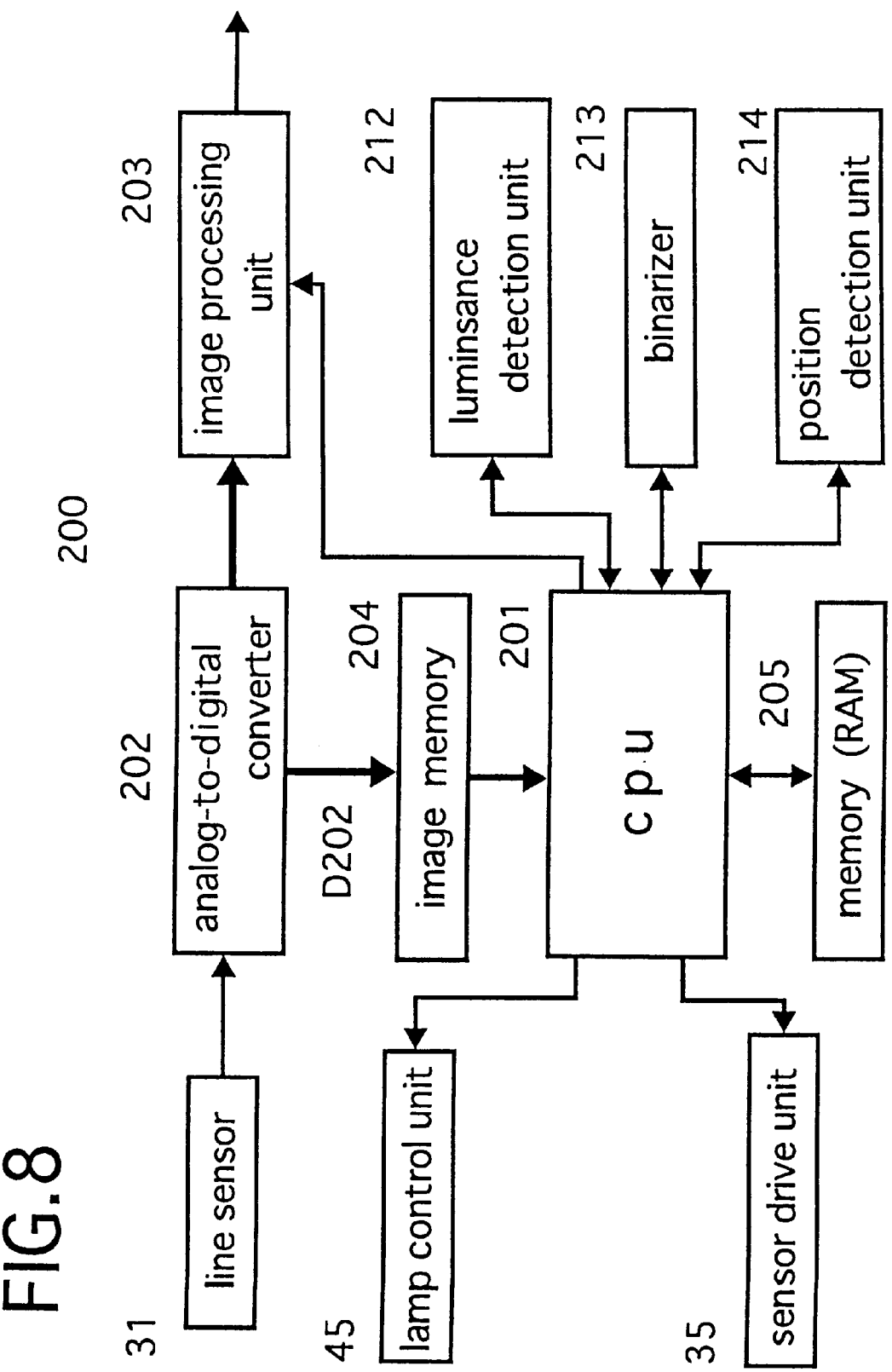
FIG. 8 is a block diagram of the signal processing unit of the book scanner of a second embodiment.

FIG. 8 is a block diagram of signal processing unit 200 of book scanner 2 of the second embodiment. The exterior view and mechanical construction of book scanner 2 of the second embodiment is identical to that of book scanner 1 of the first embodiment (refer to FIG. 1). That is, book scanner 2 is an image reading apparatus with a construction which provides an open space between document platen 20 and image sensing unit 30.

Signal processing unit 200 of book scanner 2 includes CPU 201, AD converter 202, image processing unit 203, image memory 204, RAM 205, luminance detection unit 212, binarizer 213, and position detection unit 214, and has an image correction function to erase unnecessary images discriminated by criteria described later.

The output of line sensor 31 is converted to image data D202 of a predetermined number of bits by AD converter 202, and said data are temporarily stored in image memory 204. Thereafter, image data D202 are transmitted from image memory 204 through CPU 201 to luminance detection unit 212 and binarizer 213. Luminance detection unit 212 generates a luminance histogram by calculating the luminance of pixels in each predetermined line or a read image, and calculates background luminance and the threshold value for discriminating tie presence of an image. Binarizer 213 converts the multi-level read image to a binary image using the calculated threshold. Position detection unit 214 expresses the scan position on the image sensing plane. CPU 201 sets the area of erasure as an unnecessary image based on the binarized read image, and posts the sets area to image processing unit 203. Image processing unit 203 executes predetermined data processing including erasure of unnecessary images on image data D202 read from image memory 204, and after said processing outputs image data to an image output device.

Figure 9A:
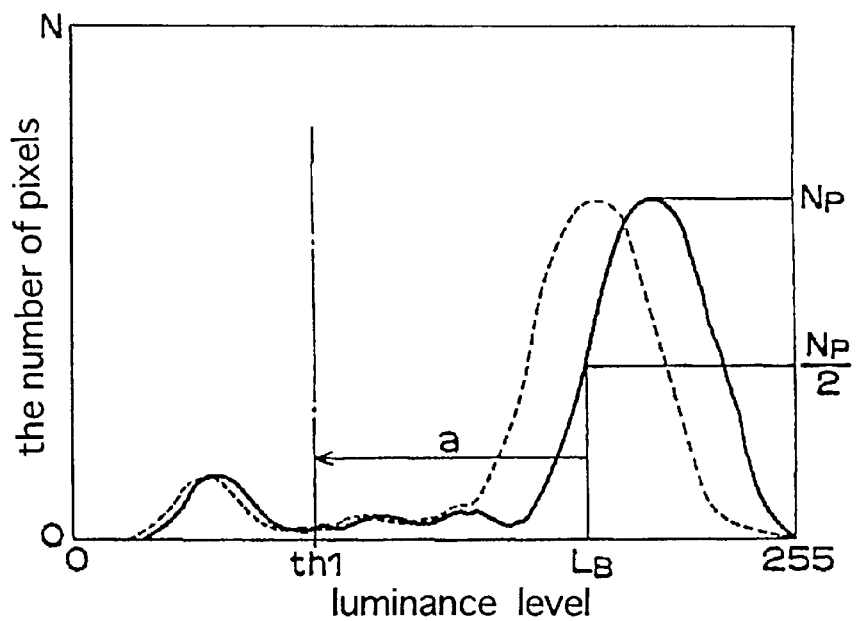
FIGS. 9A and 9B illustrate the function of the luminance detection unit.
Figure 9B:
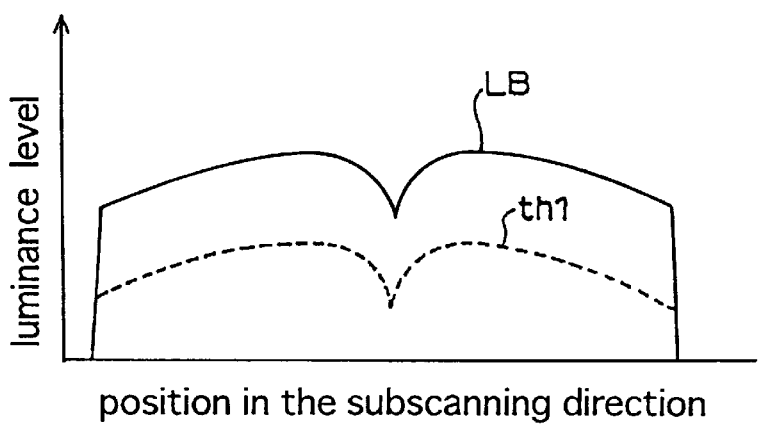

FIGS. 9A and 9B illustrate the function of luminance detection unit 212. FIG. 9A shows an example of a luminance histogram of one line, and FIG. 9B shows the relationship between background luminance and the position in the subscan direction.

Luminance detection unit 212 selects a level on the low luminance side between two luminance levels at the half way point at which the number of pixels is, for example, a peak value Np, and designates said level as the target line background luminance LB. Then a luminance level a constant quantity below said selected luminance level LB is designated threshold value th1 for discriminating the presence of an image. The bilateral edges and center portion of an open book document BD are darker than the areas near the center of the right and left pages due to the inclination of the document surface. The bilateral edges often have low luminance due to the faded color of the paper. In these dark areas, the peak of the luminance distribution is shifted to the low luminance side as indicated by the dashed line in FIG. 9A. Accordingly, the background luminance LB differs depending on the position in the subscan direction, as shown in FIG. 9B, such that the threshold value th1 also differs depending on the position in the subscan direction. The essence of calculating the background luminance LB is not limited to the example shown in FIG. 9 inasmuch as the number of pixels may be counted from the high luminance side, and the count value set to designate that luminance as background luminance LB. Furthermore, the threshold value th1 may be a fixed value. There is known to be a constant correlation between luminance and density, such that binarization of luminance by the threshold value th1 means density magnitude discrimination.

FIGS. 10A through 10E illustrate the method of extracting unnecessary images in the second embodiment. FIG. 10A shows the essential part of binarized read image G0', and FIGS. 10B through 10E are partial enlargements of said part of FIG. 10A. The squares in FIGS. 10C and 10E are pixels g.

In FIG. 10A, the binarized read image G0' comprises document surface image G1', document platen image G20', and hand image GH'. The document surface image G1' is an image of main information of text and graphics, and includes additional information of header image GT' of the necessary image, and finger image GHa' of the unnecessary image. Finger image GHa' is part of the hand image GH'. Book scanner 2 extracts unnecessary images by the following criteria.

First, the edges of the document surface are detected by density discrimination. At this time, the mean density (ratio of background and image) of each line is determined for the edges on the subscan direction (i.e., right edge ER and left edge EL) are determined, and the difference of the mean density between adjacent lines is checked. The pixel position of extreme differences in mean density is the edge. The detection of the edges is possible because in book document BD, the part corresponding to the bilateral surfaces in the opening direction of the book document, i.e., the fore-edge of the book document, are darker than the background portion of the document surface S1. The mean density of pixels in one column is determined at each pixel position in the main scan direction at the edge in the main scan direction (i.e., the bottom edge), and the difference in mean density is checked between adjacent columns. Since document platen 20 is colored a dark color, edge detection is readily accomplished.

Then, the image connected to the edge in document surface image G1' is extracted as a document edge image. In FIG. 10A, header image GT' and finger image GHa' correspond to said document edge image.

The outline (i.e., arrangement (shape) of pixel groups comprising the peripheral edges of the document edge image) of the extracted document edge image and the state of intersection at which said document edge image connects to the edge are examined. Specifically, the near side of the edge of the outline of the document edge image, i.e., the part within an area of constant width (e.g., 10 pixels) in a direction perpendicular to the edge, is targeted and the amount of positional shift in a direction parallel to the edge in the target area is checked. In the case of header image GT', when the near side F1a of right edge ER is targeted in part F1 which does not match right edge ER in the outline of header GT', the amount of positional shift in the main scan direction of standard pixels connected to right edge ER is ±1 pixel. If the amount of position shift is less than a constant value (e g., ±1 to 2 pixels), the near side F1a is a straight line perpendicular to right edge ER. In the case of finger image GHa', in contrast, when the near side F2a of right edge ER is targeted in part F2 which does not match right edge ER in the outline of finger image GHa', the amount of positional shift in the main scan direction of standard pixels connected to right edge ER is 6 pixels. That is, the amount of position shift is greater than the constant value, such that near side F2a of right edge ER in the outline of finger image GHa' is determined to not be perpendicular to right edge ER.

The outline of the document edge image and the intersection state of the edge is checked, and the document edge image wherein at least the near side of the edge in the outline is a straight line perpendicular to the edge is discriminated as a necessary image, whereas the document edge image a perpendicular straight line is discriminated as an unnecessary image. This discrimination is based on the characteristics that the outline of the image of a user hand are extremely unlikely to be perpendicular to the edge of a document whereas most headers are rectangular and have an outline the sides of which are parallel to and perpendicular to the edge of the document.

Figure 11A:
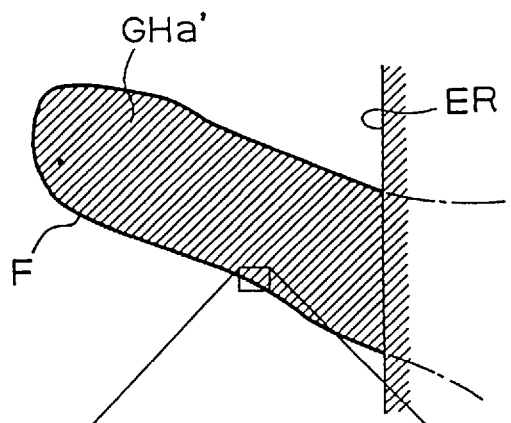
FIGS. 11A and 11B show examples of image discrimination by outline shape.
Figure 11B:
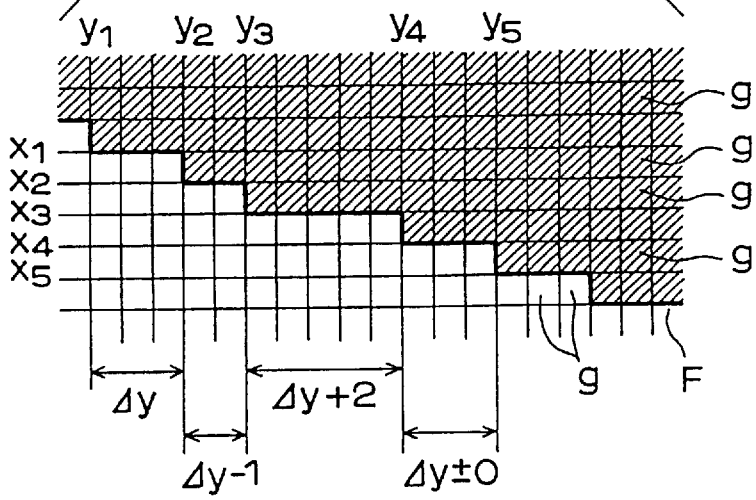

FIGS. 11A and 11B show an example of image discrimination by outline contour. FIG. 11A shows binarized finger image GHa', and FIG. 11B is a partial enlargement of FIG. 11A.

Checking whether or not the outline includes a curved area is another method of discriminating the document edge image based on the outline. That is, the document edge image is extracted by the criteria described above, and a check is made to determine whether or not a part of the outline of said document edge image is a curved line. Specifically, in the outline F of the document edge image (in this case, finger image GHa'), a section of a specific width (e.g., 5 pixels) consecutive in the first scan direction (e.g., main scan direction) is targeted, and outline positions y1 through y5 are checked in the second scan direction (e.g., subscan direction) at each pixel position x1 through x5 within the section. The difference in outline position between the adjoining pixel positions is determined, and the amount of increase or decrease in the difference in outline position is checked sequentially from one end of the section to the other end. If the amount of increase or decrease is greater than a constant value (e.g., 2 pixels), that part within the section of outline F is designated a curved line, and the document edge image is discriminated as an unnecessary image. On the other hand, if the amount of increase or decrease is less than a constant value, that part within the section of outline F is designated as not being a curved line, and the document edge image is discriminated as a necessary image In FIG. 11B, when the difference $\Delta y$ ($\Delta y=3$) of the outline position between pixel position x1 and the pixel position x2 is set as standard, the difference (|y4−y3|) of the outline position between pixel position x3 and pixel position x4 is 5, such that the increase amount is 2 (=5−Δy), and the discrimination result is that outline F includes a curve, and finger image GHa' is an unnecessary image.

Either one or the other of the discrimination method of FIG. 10 or the discrimination method of FIG. 11 may be used to set the unnecessary image (unnecessary image to be erased within the correction range of the read image) within the document edge image, or both discrimination methods may be used, and the document edge image discriminated as an unnecessary image by either methods may be erased. That is, book scanner 2 of the present embodiment, is constructed so as to allow either service personnel or a user to selectively switch among the three discrimination methods (i.e., the discrimination method of FIG. 10, the discrimination method of FIG. 11, or the combined discrimination methods of both FIGS. 10 and 11).

Figure 12:
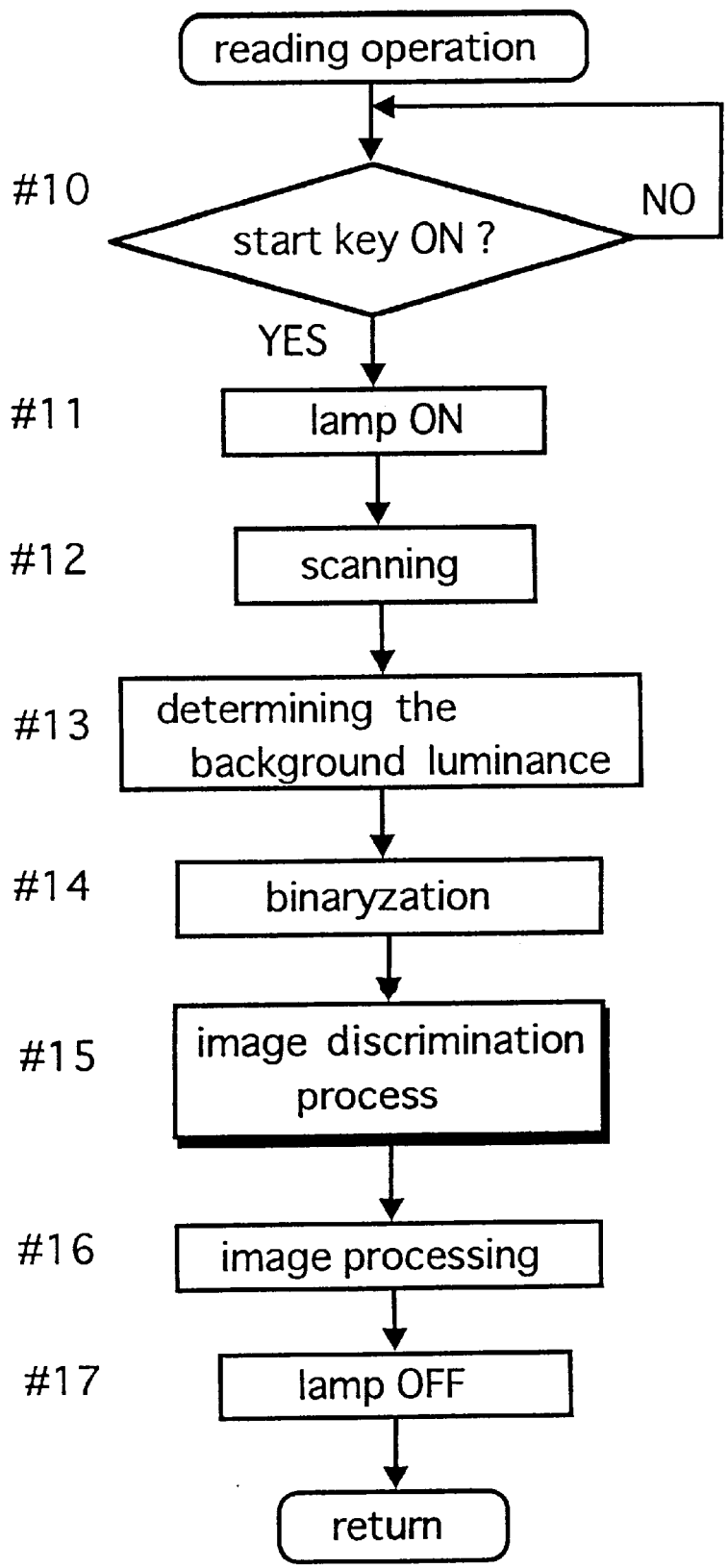
FIG. 12 is a flow chart briefly showing the operation of the book scanner of the second embodiment.

FIG. 12 is a flow chart briefly showing the operation of book scanner 2 of the second embodiment.

The illumination lamp is lighted and scanning is accomplished by switching ON either of two start keys 52 and 53 (#10, #11, #12). During scanning, image data D202 comprising the read image G0 are sequentially stored in image memory 204 for each line. After scanning ends, luminance detection is executed to determine the background luminance LB and calculate the threshold value th1 (#13), and this threshold value th1 is used to binarize the read image G0(#14). After binarization, an image discrimination process is executed to extract the unnecessary images from the read image G0' and set the correction range of read image G0 (#15), and image processing including the erasure of unnecessary images is executed and the resulting image data are output to an image output device (#16). Thereafter, the illumination lamp is turned OFF, and the routine returns to the standby state (#17).

Figure 13:
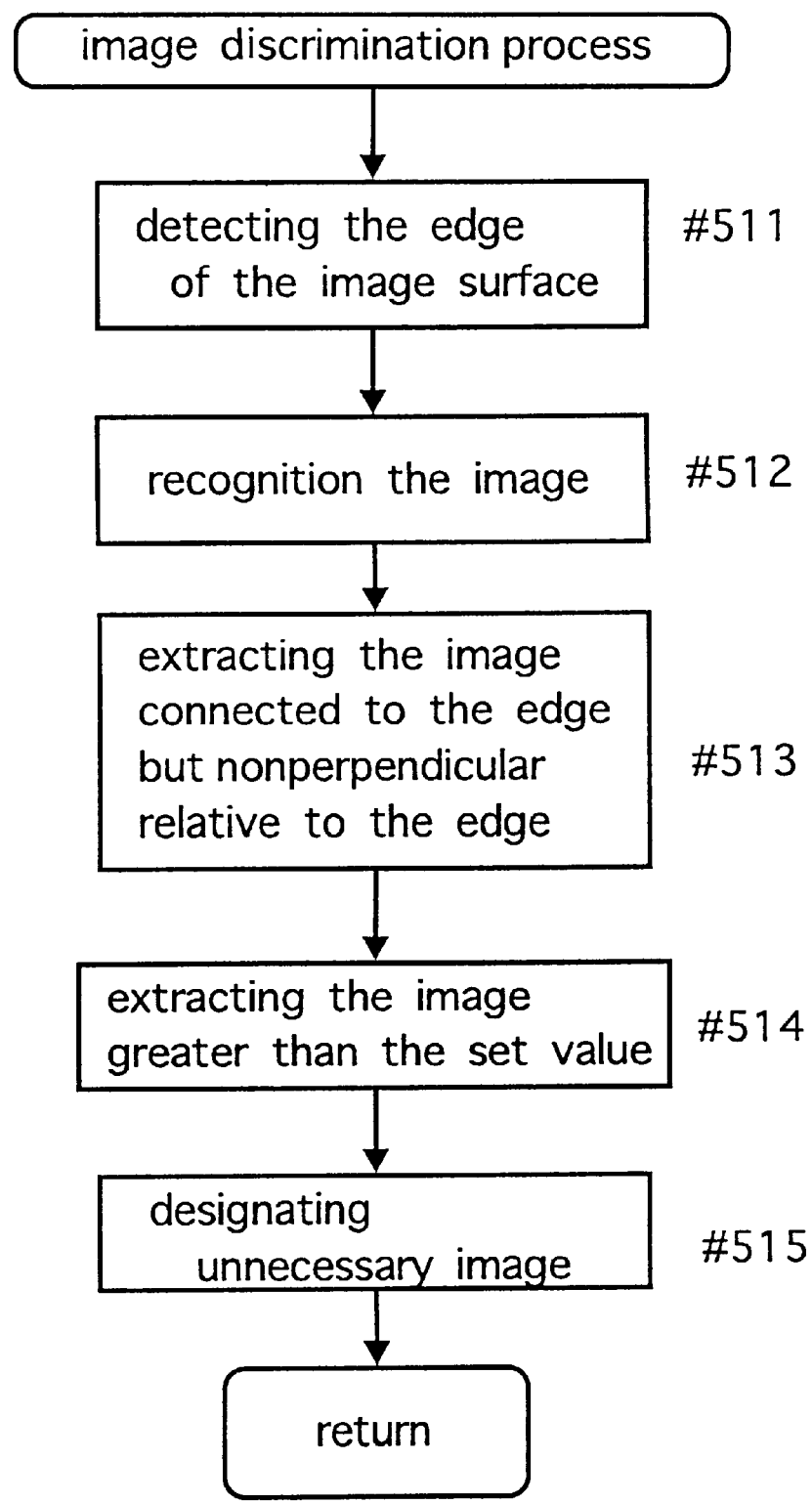
FIG. 13 shows an example of the subroutine of the image discrimination process of FIG. 12.

FIG. 13 shows an example of a subroutine of the image discrimination process routine of FIG. 12. The edge of the image surface is detected (#511), and an image of aggregate pixels wherein the density is greater than a constant value is recognized (#512). The image wherein the near side of the edge of the outline is not perpendicular to the edge and is connected to the edge of the document surface, i.e., the image connected to the edge but nonperpendicular relative to the edge is extracted as described in FIG. 10 (#513). The image greater than the set value is extracted (#514). The sequence of steps #513 and #514 does not matter. An image satisfying both extraction conditions of steps #513 and #514, i.e., an image connected to but not perpendicular to the edge and having a size exceeding a set value, is designated an unnecessary image (#515). It is not necessary that the size of the image is used as a discrimination condition, inasmuch as a routine may be used which discriminates an image connected to but not perpendicular to the edge as an unnecessary image regardless of the image size.

Figure 14:
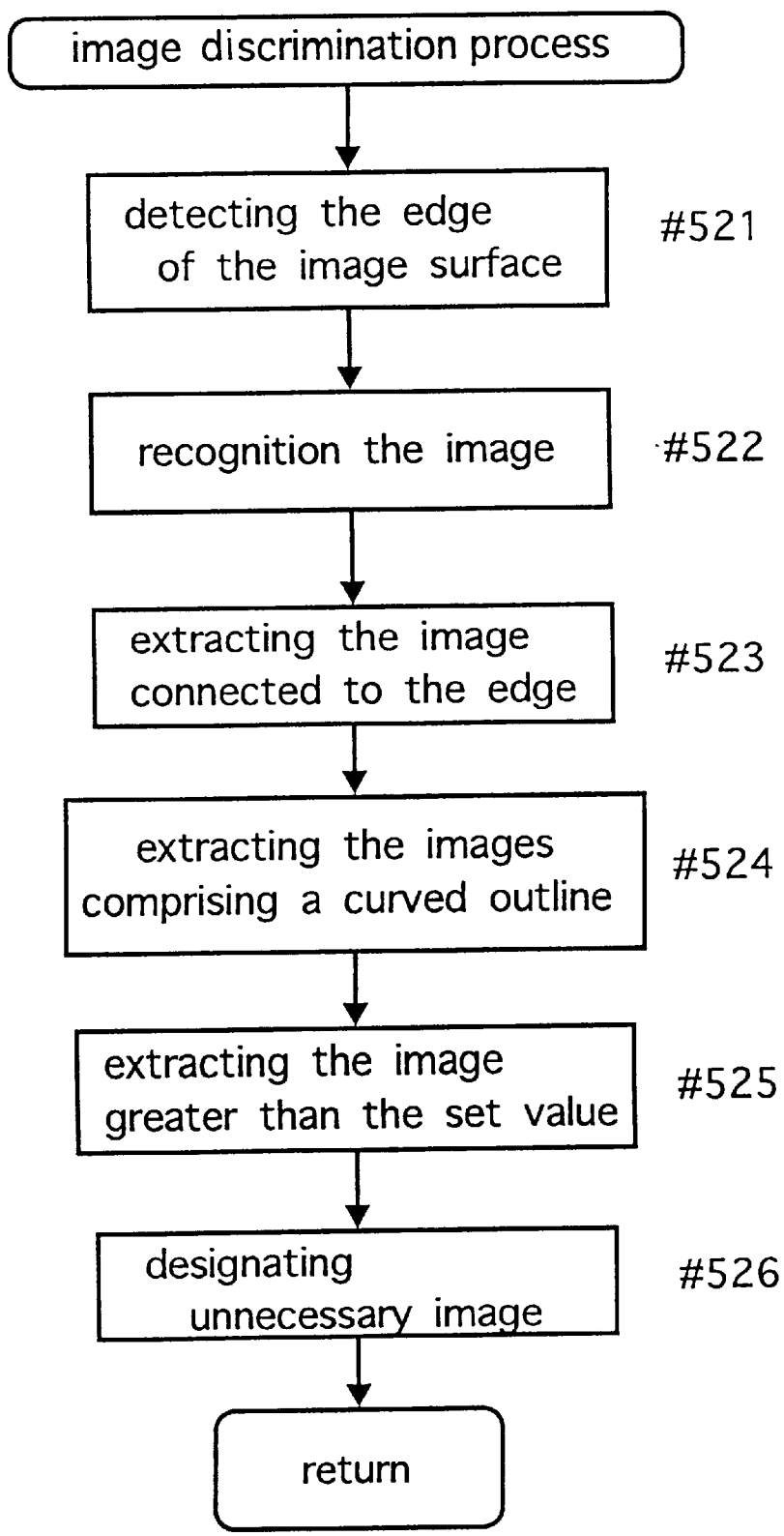
FIG. 14 shows another example of the subroutine of the image discrimination process of FIG. 12.

FIG. 14 show another example of a subroutine of the image discrimination process routine of FIG. 12.

The edge of the image surface is detected (#521), and images including aggregate pixels having a density grater than a constant value are recognized (#522). The images connected to the edge are extracted (#523), the images comprising a curved outline are extracted via the criteria described in FIG. 11 (#524), and the images larger than a set value are extracted (#525). The sequence of steps #523, #524, and #525 does not matter. Images all the extraction criteria of steps #523, #524, #525, i.e., images connected to the edge, which have a curved outline, and which are larger than a constant value, are discriminated as unnecessary images (#526). In this example, the size of the image need not be used as criteria for discriminating unnecessary images as previously described in FIG. 13.

Third Embodiment

Figure 15:
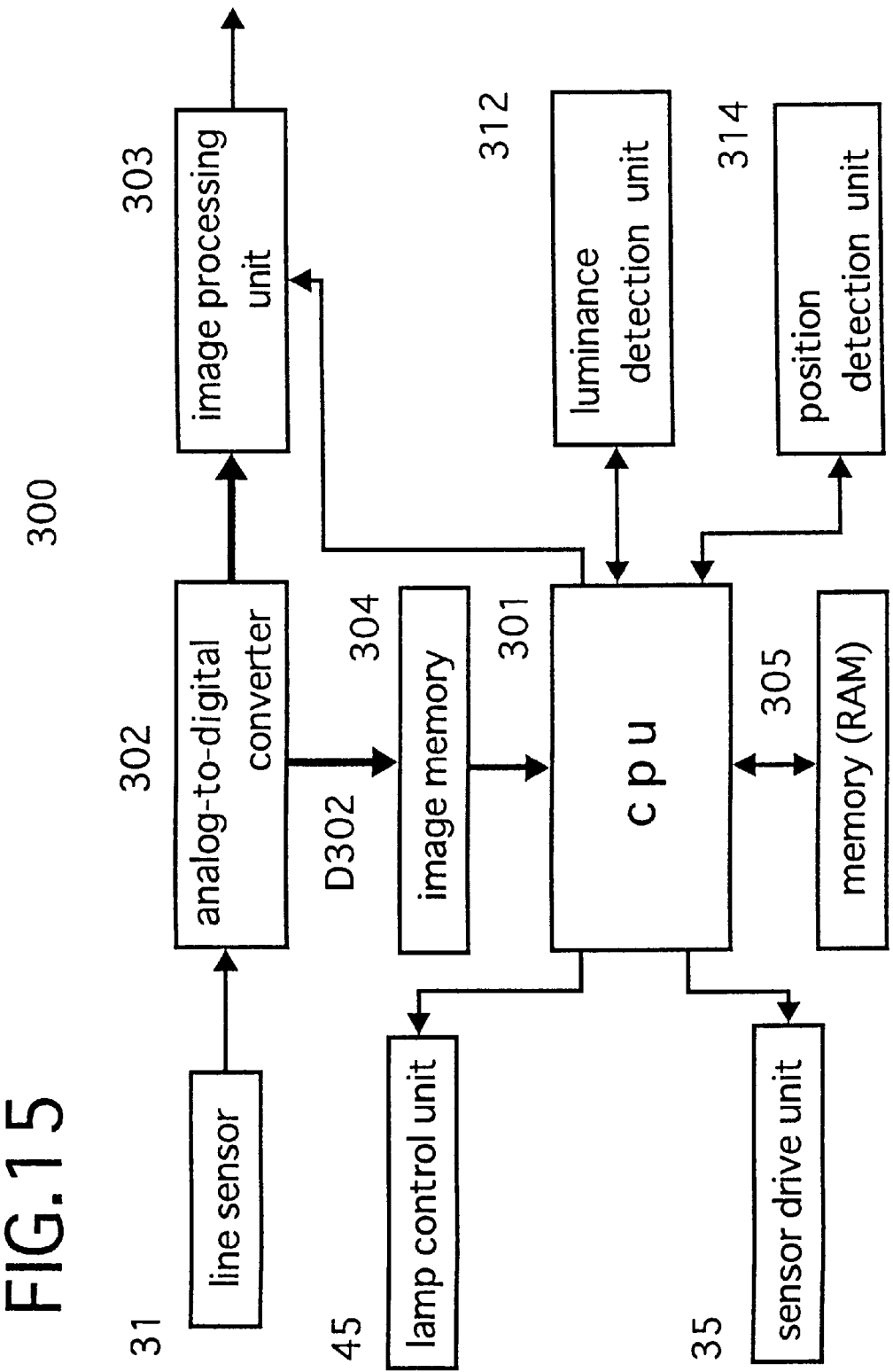
FIG. 15 is a block diagram of the signal processing unit of the book scanner of a third embodiment.

FIG. 15 is a block diagram of signal processing unit 300 of book scanner 3 of the third embodiment. The exterior view and mechanical construction of book scanner 3 of the third embodiment is identical to that of book scanner 1 of the first embodiment (refer to FIG. 1). That is, book scanner 3 is an image reading apparatus with a construction which provides an open space between document platen 20 and image sensing unit 30.

Signal processing unit 300 of book scanner 3 includes CPU 301, AD converter 302, image processing unit 303, image memory 304, RAM 305, luminance detection unit 312, and position detection unit 314, and has an image correction function to erase unnecessary images discriminated by criteria described later.

The output of line sensor 31 is converted to image data D302 of a predetermined number of bits by AD converter 302, and said data are temporarily stored in image memory 304. Thereafter, image data D302 are transmitted from image memory 304 through CPU 301 to luminance detection unit. Luminance detection unit 312 generates a luminance histogram by calculating the luminance of pixels in each predetermined line of a read image, and calculates the luminance range (i.e., pixel density range) for image discrimination. Position detection unit 314 expresses the scan position on the image sensing plane. CPU 301 sets the area of erasure as an unnecessary image based on the read image, and posts the sets area to image processing unit 303. Image processing unit 303 executes predetermined data processing including erasure of unnecessary images on image data D302 read from image memory 304, and after is said processing outputs image data to an image output device.

Figures 16A, 16B, 16C:
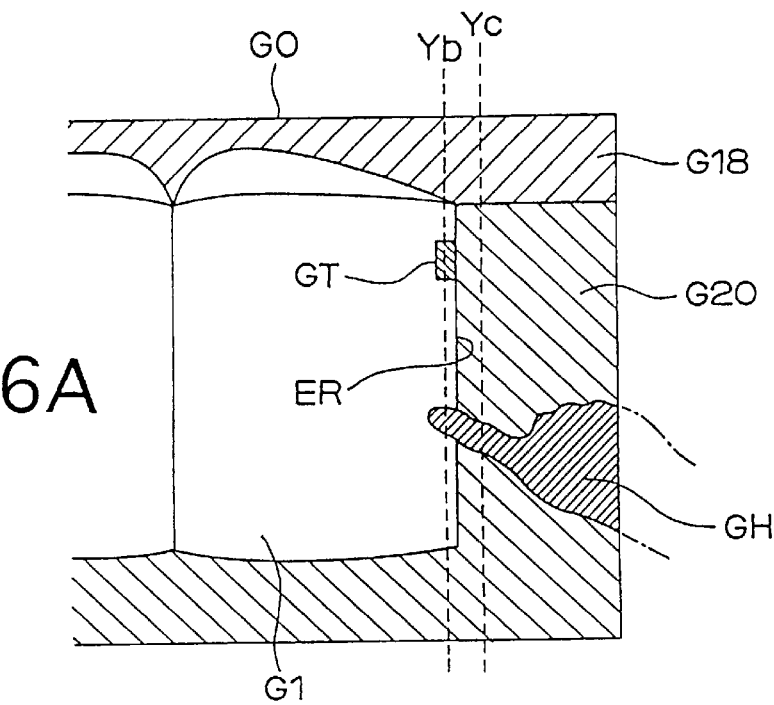
FIGS. 16A through 16C illustrate a method of extracting unnecessary images of the third embodiment.

FIG. 16 illustrates the method of extracting unnecessary images in the third embodiment. FIG. 16A shows the essential portion of read image G0, and FIGS. 16B and 16C show the luminance distributions corresponding to FIG. 16A.

In FIG. 16A, the read image G0 comprises document surface image G1, document platen image G20, projection panel image G18, and hand image GH. The document surface image G1 is an image of main information of text and graphics, and includes additional information of header image GT of the necessary image. Hand amage GH straddles both sides of the right edge ER of document surface image G1. Book scanner 3 extracts unnecessary images by the following criteria.

First, the edges of the document surface are detected by density discrimination. Differences in the mean density between adjacent lines is checked for the edges in the subscan direction. Pixel positions having extremely different mean densities are the edge. Differences in means density between adjacent columns is checked for the edge in the main scan direction (bottom edge).

Then, the luminance (density) in document surface image G1 wherein the aggregate pixels within a fixed range ΔB are extracted as specific density image for discrimination. The luminance of header image GT and hand image GH are values within the set range ΔB shown in FIG. 16B at the line Yb corresponding to the near side of the interior side (left side) of right edge ER among the two lines Yb and Yc described by the dashed lines in FIG. 16A. The luminance of hand image GH is also a value within the set range ΔB at line Yc corresponding to the exterior side (right side) of right edge ER. The pixels within the set range ΔB are extracted from each line in the subscan direction, and a check is made to determine whether or not the extracted pixels adjacent. Pixels which are part of a group of mutually adjacent pixels are designated a specific density image. In FIG. 16, header GT and hand image GH are specific density images. The lower limit and width of the set range ΔB may be calculated for each line based on the luminance distribution, and values common to all lines may be calculated. Furthermore, fixed values may be calculated beforehand by experimentation.

Then a check is made to determine whether or not the extracted document edge image is completely the edge of the document surface, i.e., whether or not a pair of pixels circumscribing the edge are attributes of the targeted document edge image, and a document edge image straddling both sides of the edge are discriminated as unnecessary images. Necessary images such as headers and the like are not present on the exterior side of the document unlike the hand of a user holding the document which straddle the interior and exterior sides of the document.

Figure 17:
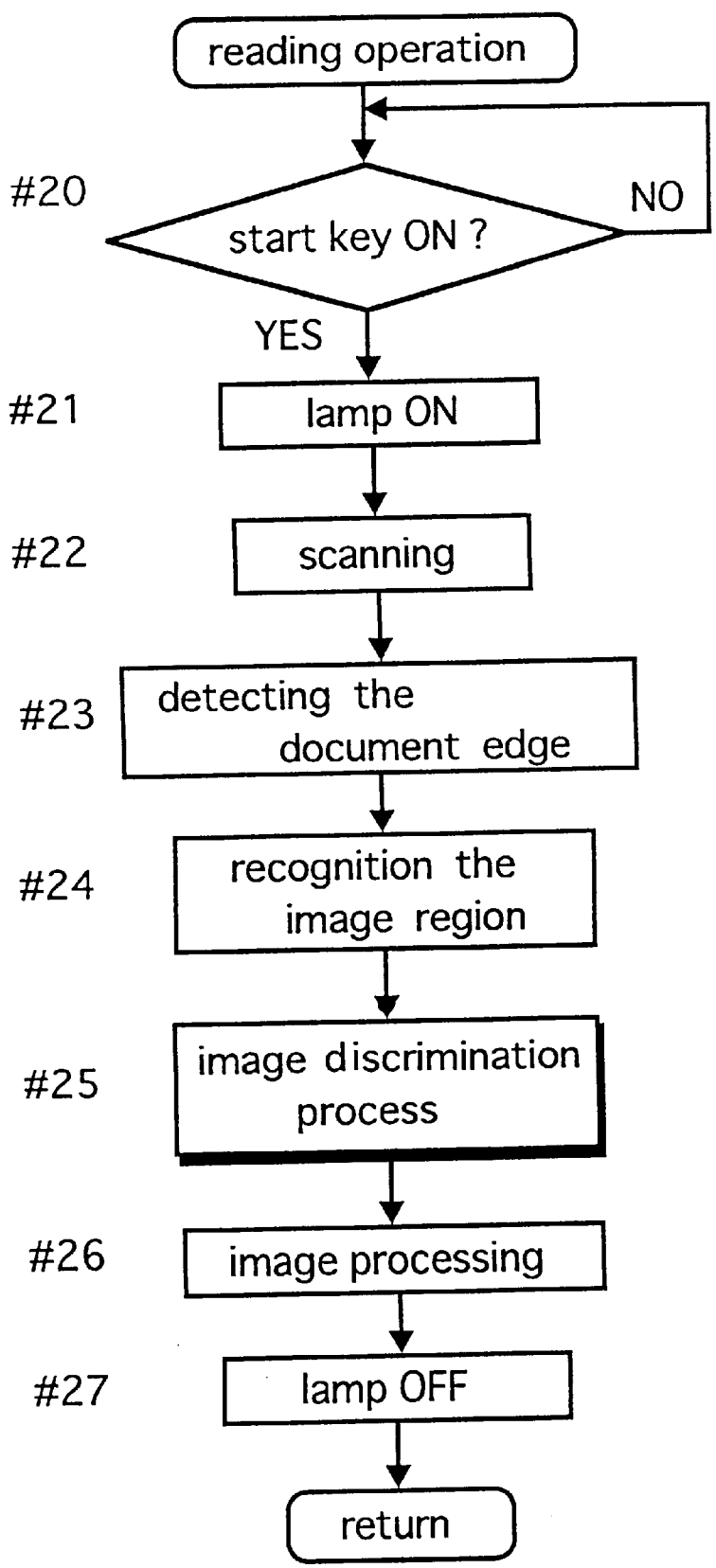
FIG. 17 is a flow chart briefly showing the operation of the book scanner of the third embodiment.

FIG. 17 is a flow chart briefly showing the operation of book scanner 3 of the third embodiment. The illumination lamp is lighted and scanning is accomplished by switching ON either of two start keys 52 and 53 (#20, #21, #22). During scanning, image data D302 comprising the read image G0 are sequentially stored in image memory 304 for each line. After scanning ends, the edge of the document surface is detected (#23), and the image region (region of luminance below a threshold value) is recognized (#24). An image discrimination process is executed to extract unnecessary images from the read image G0 and set the correction range of the read image G0(#25), and image processing is executed including the erasure of unnecessary images, and the image data are output to an image output device (#26). Thereafter, the illumination lamp is turned OFF and the routine returns to the standby state (#27).

Figure 18:
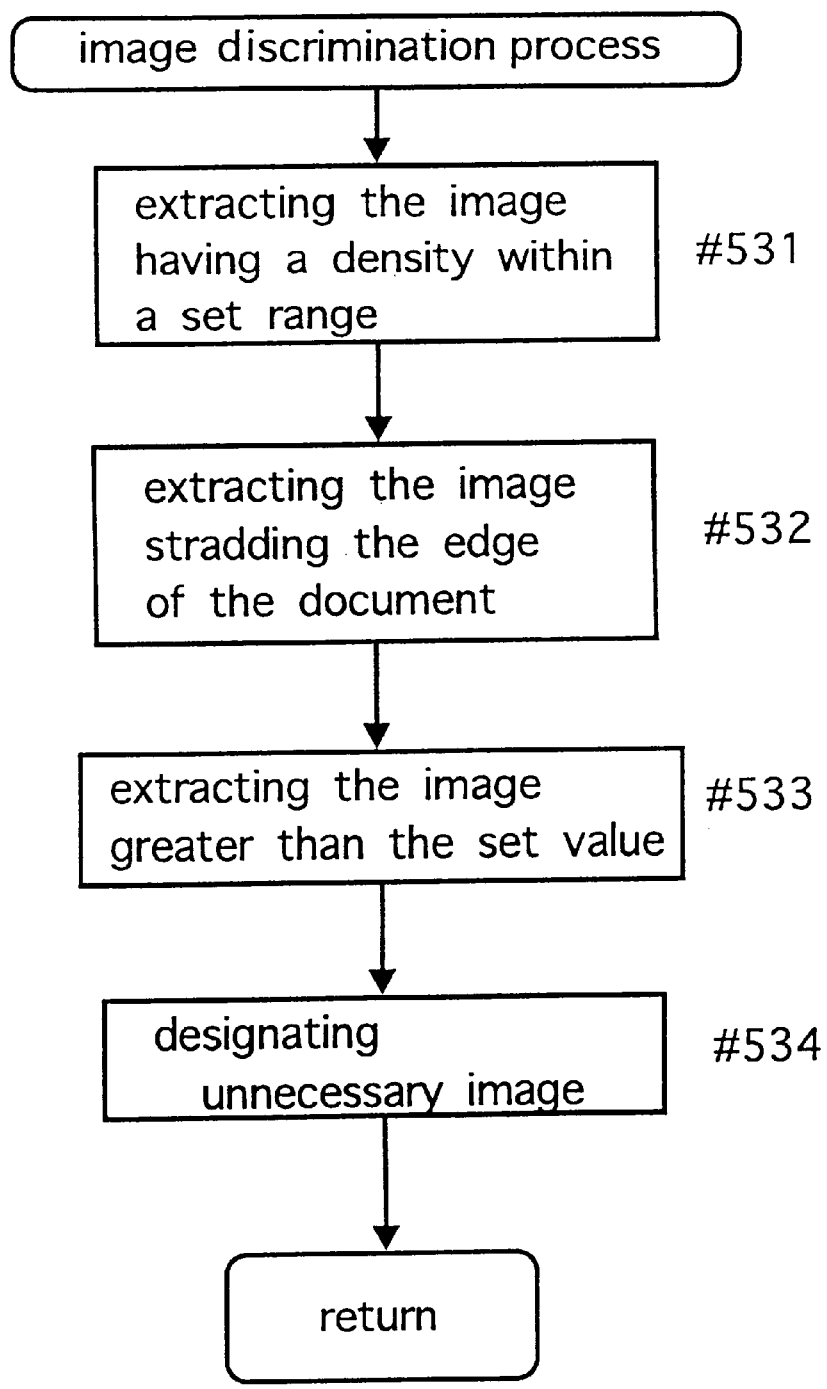
FIG. 18 shows an example of the subroutine of the image discrimination process of FIG. 17.
Figure 19A:
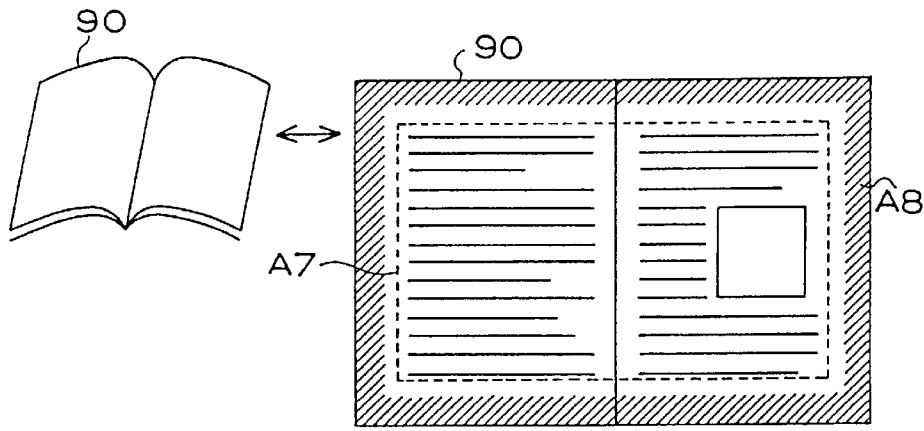
FIGS. 19A through 19C illustrate problems of the prior art.
Figure 19B:
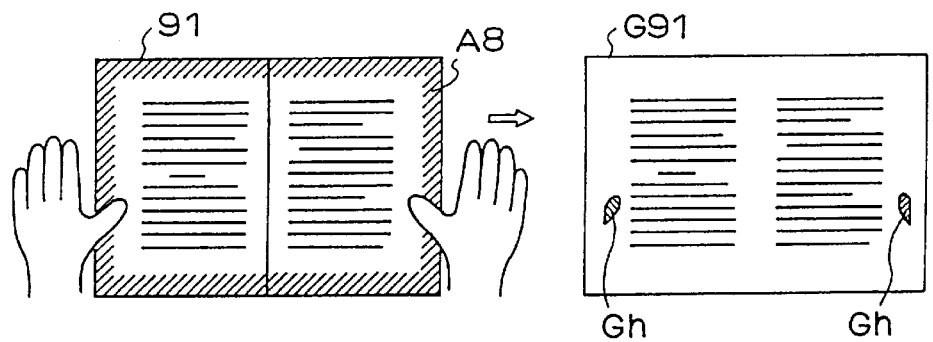
Figure 19C:
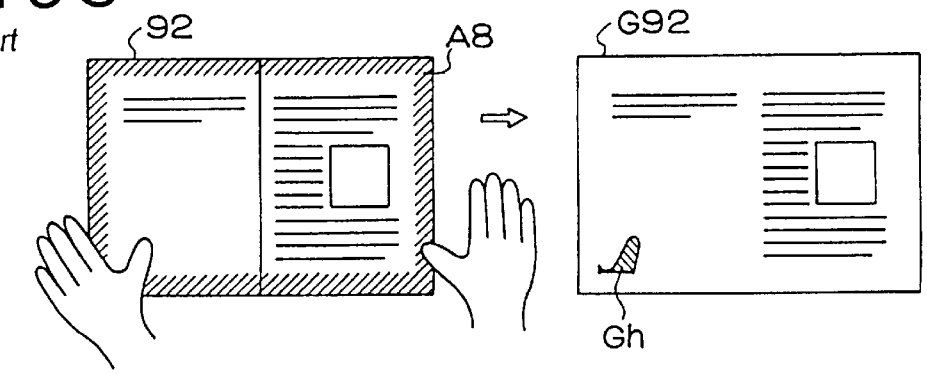

FIG. 18 shows an example of a subroutine of the image discrimination process routine of FIG. 17. The image having a density within a set range is extracted (#531), the image straddling the edge of the document surface is extracted (#532), and the image of a size greater than a set value is extracted (#533). The sequence of steps #531, #532, and #533 does not matter. Images satisfying all the extraction criteria of steps is #531, #532, #533, i.e., images having a density within a set range, connected to the edge, and which are larger than a set value, are discriminated as unnecessary images (#534). Image size is not a necessary condition of discrimination in as much as a density within a constant range, or image connected to the edge may be discriminated as an unnecessary image regardless of size.

Although in all of the above embodiments, the scanning operation is executed twice, unnecessary images are extracted and erasure range set by a first reading, and image corresponding to the erasure range set in the first reading are erased during a second reading, it is to be noted that erasure of the unnecessary images may be accomplished via a single document reading operation.

The above embodiments have been described based on a book scanner as an image reading apparatus, the present invention is not limited to a book scanner and may be other image reading device provided with adequate space between a document platen and an image sensing unit.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image processing apparatus comprising:
   an image reader which reads an image and generates an image data having a predetermined area;
   area setting means for setting a first area and a second area in said predetermined area, wherein a shape of said second area is rectangular and three sides of said rectangular second area are included in said first area;
   a detector which detects an obstacle in a detection area based on the image data, the detection area being between an inside of said first area and an outside of said second area; and
   a controller which controls image of said obstacle detected by said detector.

2. The image processing apparatus as claimed in claim 1, wherein said controller erases said image of said obstacle.

3. The image processing apparatus as claimed in claim 1, wherein said first area coincides with said predetermined area.

4. The image processing apparatus as claimed in claim 1, wherein said image processing apparatus has an open space between a document having said image and said image reader.

5. The image processing apparatus as claimed in claim 4, wherein said obstacle corresponds to a hand and finger pressing down said document.

6. An image processing apparatus comprising:
   an image reader which reads an image and generates an image data having a predetermined area;
   area setting means for setting a first area and a second area to said predetermined area, wherein said second area is included in said first area and has a distance from a bottom edge of said first area;
   a detector which detects an obstacle based on the image data in a detection area which is between an inside of said first area and an outside of said second area; and
   a controller which controls image of said obstacle detected by said detector.

7. The image processing apparatus as claimed in claim 6, wherein said controller erases said image of said obstacle.

8. The image processing apparatus as claimed in claim 6, wherein said first area coincides with said predetermined area.

9. The image processing apparatus as claimed in claim 6, wherein said image processing apparatus has an open space between a document having said image and said image reader.

10. The image processing apparatus as claimed in claim 9, wherein said obstacle corresponds to a hand and finger pressing down said document.

11. An image processing apparatus comprising:
    an image reader which reads an image and generates an image data having a predetermined area;
    an area dividing means for dividing said predetermined area into a plurality of blocks, wherein each block has a plurality of image pixels;
    a detector which detects an obstacle based on the image data in said each block; and
    a controller which controls image of said obstacle detected by said detector, wherein said detector detects whether the number of image pixels having higher a density level than a predetermined density level is higher than a predetermined number or not in said each block, whereby the density level of image in said each block is detected.

12. The image processing apparatus as claimed in claim 11, wherein said controller erases said image of said obstacle.

13. The image processing apparatus as claimed in claim 11,
wherein said detector detects a connecting condition of blocks including image pixel having said higher density level than the predetermined density level.

14. The image processing apparatus as claimed in claim 11,
wherein said image pixels in connected blocks are defined as said obstacle when said detector detects blocks including pixels having said higher density level than the predetermined density level are connected to each other.

15. An image processing apparatus comprising:
an image reader which reads an image data having a predetermined area;
an area dividing means for dividing said predetermined area into a plurality blocks, wherein each block has a plurality of image pixels;
a detector which detects an obstacle based on the image data in said each block; and
a controller which controls image of said obstacle detected by said detector, wherein said detector detects whether the average of density level of all image pixels in said each block is higher than a predetermined value or not, whereby the density level of image in said each block is detected.

16. The image processing apparatus as claimed in claim 15,
wherein said controller erases said image of said obstacle.

17. The image processing apparatus as claimed in claim 15,
wherein said image processing apparatus has an open space between a document having said image and said image reader.

18. The image processing apparatus as claimed in claim 17,
wherein said obstacle corresponds to a hand and finger pressing down said document.

19. The image processing apparatus as claimed in claim 15, wherein said detector detects a connecting condition of blocks having said higher average than the predetermined value.

20. The image processing apparatus as claimed in claim 19, wherein the image pixel in connected blocks are defined as said obstacle when said detector detects blocks having said higher average than the predetermined value are connected to each other.

21. The image processing apparatus as claimed in claim 11,
wherein said image processing apparatus has an open space between a document having said image and said image reader.

22. The image processing apparatus as claimed in claim 21, wherein said obstacle corresponds to a hand and finger pressing down said document.

23. An image processing apparatus comprising:
an image reader which reads an image and generates an image data having a predetermined area;
an area setting means for setting a first area and a second area to said predetermined area, wherein said second area is included in said first area;
a detector which extracts image data in a detection area which is between an inside of said first area and an outside of said second area, and defines said image data as an obstacle based on a contacting condition between said image data and an exterior edge of said second area; and
a controller which controls image of said obstacle.

24. The image processing apparatus as claimed in claim 23, wherein said detector defines said image data as said obstacle when said image data contacts with said exterior edge of said second area.

25. The image processing apparatus as claimed in claim 24,
wherein said image processing apparatus has an open space between a document having said image and said image reader.

26. The image processing apparatus as claimed in claim 25, wherein said obstacle corresponds to a hand and finger pressing down said document.

27. The image processing apparatus as claimed in claim 26, wherein said controller erases said image of said obstacle.

28. The image processing apparatus as claimed in claim 24, wherein said detector defines said image data as said obstacle when said image data contacts with an exterior edge of said first area.

29. The image processing apparatus as claimed in claim 28,
wherein said image processing apparatus has an open space between a document having said image and said image reader.

30. The image processing apparatus as claimed in claim 29, wherein said obstacle corresponds to a hand and finger pressing down said document.

31. The image processing apparatus as claimed in claim 30, wherein said controller erases said image of said obstacle.

32. An image processing apparatus comprising:
an image reader which reads an image and generates an image data having a predetermined area;
an area setting means for setting an area to said predetermined area;
a detector which extracts an image data in said setting area, and defines said image data as an obstacle based on a contacting condition between said image data and an exterior edge of said setting area; and
a controller which controls image of said obstacle.

33. The image processing apparatus as claimed in claim 32, wherein said detector defines said image data as said obstacle when said image data contacts with said exterior edge of said setting area with non-perpendicular condition.

34. The image processing apparatus as claimed in claim 33,
wherein said image processing apparatus has an open space between a document having said image and said image reader.

35. The image processing apparatus as claimed in claim 34, wherein said obstacle corresponds to a hand and finger pressing down said document.

36. The image processing apparatus as claimed in claim 35, wherein said controller erases said image of said obstacle.

37. The image processing apparatus as claimed in claim 32, wherein said detector defines said image data as said obstacle when said image data has a curving area contacting with said exterior edge of said setting area.

38. The image processing apparatus as claimed in claim 37,
wherein said image processing apparatus has an open space between a document having said image and said image reader.

39. The image processing apparatus as claimed in claim 38, wherein said obstacle corresponds to a hand and finger pressing down said document.

40. The image processing apparatus as claimed in claim 39, wherein said controller erases said image of said obstacle.

41. The image processing apparatus as claimed in claim 32, wherein said detector does not define said image data as said obstacle when said image data contacts with said exterior edge of said setting area with perpendicular condition.

42. The image processing apparatus as claimed in claim 32, wherein said detector does not define said image data as said obstacle when said image data has a rectangular area contacting with said exterior edge of said setting area.

43. The image processing apparatus as claimed in claim 32, wherein said detector defines said image data as said obstacle when said image data intersects said exterior edge of said setting area.

44. An image processing apparatus comprising:
an image reader which reads an image and generates an image data having a predetermined area;
an area setting means for setting an area to said predetermined area;
a detector which defines an obstacle based on image data of inside of said setting area and image data of outside of said setting area; and
a controller which controls image of said obstacle.

45. The image processing apparatus as claimed in claim 44, wherein said detector defines said image data as said obstacle when said image data intersects an exterior edge of said setting area.

46. The image processing apparatus as claimed in claim 45, wherein said controller erases said image of said obstacle.

47. The image processing apparatus as claimed in claim 46,
wherein said image processing apparatus has an open space between a document having said image and said image reader.

48. The image processing apparatus as claimed in claim 47, wherein said obstacle corresponds to a hand and finger pressing down said document.

49. The image processing apparatus as claimed in claim 44, wherein said detector does not define said image data as said obstacle when said image data does not expand to outside of an exterior edge of said setting area.

50. An image processing apparatus comprising:
an image reader which reads an image and generates an image data having a predetermined area;
an area setting means for setting an area to said predetermined area;
a detector which extracts image data in said setting area and defines said image data as an obstacle based on the size of said extracted image data; and
a controller which controls image of said obstacle.

51. The image processing apparatus as claimed in claim 50, wherein said detector defines said image data as said obstacle when said image data have a larger size than the predetermined size.

52. The image processing apparatus as claimed in claim 51, wherein said controller, erases said image of said obstacle.

53. The image processing apparatus as claimed in claim 52,
wherein said image processing apparatus has an open space between a document having said image and said image reader.

54. The image processing apparatus as claimed in claim 53, wherein said obstacle corresponds to a hand and finger pressing down said document.

* * * * *

UNITED STATES PATENT AND TRADEMARK OFFICE
CERTIFICATE OF CORRECTION

PATENT NO. : 6,011,635
DATED : January 4, 2000
INVENTOR(S) : Keiichiro Bungo et al.

It is certified that error appears in the above-identified patent and that said Letters Patent is hereby corrected as shown below:

Column 14,
Line 2, delete "an"; (third occurrence)

Column 15,
Line 1, after "whether", delete "the" and insert --, in said each block, a --;
Line 2, after "having", insert -- a -- and after "higher", delete "a";
Line 4, delete "or not in said each block";
Line 5, after "level of", change "image in said each block is detected" to -- the image of said obstacle in said each block is detected --.

Column 17,
Line 37, delete Claim 45 in its entirety and replace with the following:
-- 45. An image processing apparatus comprising:
an image reader which reads an image and generates image data of a predetermined area; an area setting means for setting a variable area to said predetermined area;
a detector which defines an obstacle based on first image data inside said variable area and second image data outside said variable area, wherein said detector defines said first and second image data as an image of said obstacle when said first and second image data intersects an exterior edge of said variable area; and
a controller which controls the image of said obstacle. --;

Column 18,
Line 25, delete Claim 50 in its entirety and replace with the following:
-- 50. An image processing apparatus comprising:
an image reader which reads an image and generates image data of a predetermined area;
an area setting means for setting a variable area to said predetermined area;

UNITED STATES PATENT AND TRADEMARK OFFICE
CERTIFICATE OF CORRECTION

PATENT NO. : 6,011,635
DATED : January 4, 2000
INVENTOR(S) : Keiichiro Bungo et al.

It is certified that error appears in the above-identified patent and that said Letters Patent is hereby corrected as shown below:

Column 18, cont.
a detector which defines an obstacle based on first image data inside said variable area and second image data outside said variable area, wherein said detector does not define said first and second image data as an image of said obstacle when said first and second image data does not extend outside of an exterior edge of said setting are; and
a controller which controls the image of said obstacle.

Signed and Sealed this

Twenty-eighth Day of May, 2002

Attest:

JAMES E. ROGAN
Attesting Officer    Director of the United States Patent and Trademark Office